United States Patent
Rupe et al.

(10) Patent No.: US 11,316,715 B1
(45) Date of Patent: Apr. 26, 2022

(54) SYSTEMS AND METHOD FOR AUTOMATICALLY IDENTIFYING AN IMPAIRMENT OF A COMMUNICATION MEDIUM

(71) Applicant: Cable Television Laboratories, Inc., Louisville, CO (US)

(72) Inventors: Jason W. Rupe, Lafayette, CO (US); Thomas Holtzman Williams, Longmont, CO (US); Lin Cheng, Superior, CO (US); Jingjie Zhu, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/382,139

(22) Filed: Jul. 21, 2021

Related U.S. Application Data

(60) Provisional application No. 63/054,460, filed on Jul. 21, 2020.

(51) Int. Cl.
*H04L 25/02* (2006.01)

(52) U.S. Cl.
CPC .................. *H04L 25/0212* (2013.01)

(58) Field of Classification Search
CPC .................................... H04L 25/0212
See application file for complete search history.

(56) References Cited

U.S. PATENT DOCUMENTS

| | | | | |
|---|---|---|---|---|
| 2004/0268190 | A1* | 12/2004 | Kossel | H04L 1/20 |
| | | | | 714/704 |
| 2013/0243131 | A1* | 9/2013 | An | H04L 1/02 |
| | | | | 375/340 |
| 2014/0273907 | A1* | 9/2014 | Narasimhan | H04L 27/3863 |
| | | | | 455/307 |
| 2017/0373749 | A1* | 12/2017 | Williams | H04B 10/2589 |

\* cited by examiner

*Primary Examiner* — Kabir A Timory
(74) *Attorney, Agent, or Firm* — PdZ Patent Law, PLLC

(57) ABSTRACT

A method for automatically identifying an impairment of a communication medium includes (1) obtaining a spectrum response of communication signals traveling through the communication medium, (2) converting the spectrum response from a frequency domain to a time domain, to generate an impulse response, and (3) identifying the impairment of the communication medium at least partially based on one or more characteristics of the impulse response.

19 Claims, 15 Drawing Sheets

SYSTEMS AND METHOD FOR AUTOMATICALLY IDENTIFYING AN IMPAIRMENT OF A COMMUNICATION MEDIUM

RELATED APPLICATIONS

This application claims benefit of priority to U.S. Provisional Patent Application Ser. No. 63/054,460, filed on Jul. 21, 2020, which is incorporated herein by reference.

BACKGROUND

Communication mediums are used to transmit data in a communication network. Examples of communication mediums include, but are not limited to, coaxial electrical cables, twisted pair electrical cables (e.g., Ethernet cables and telephone cables), optical cables, and free space (e.g., for free space radio wireless communication links and free space optical wireless communication links). Communication networks are increasingly capable of transmitting data though a communication medium at a high bandwidth, such as by using sophisticated modulation techniques. However, these modulation techniques frequently require a substantially ideal communication medium, and an impairment to the communication medium may therefore significantly degrade, or even completely inhibit, data transmission through the communication medium.

DETAILED DESCRIPTION OF THE EMBODIMENTS

Figure 1:
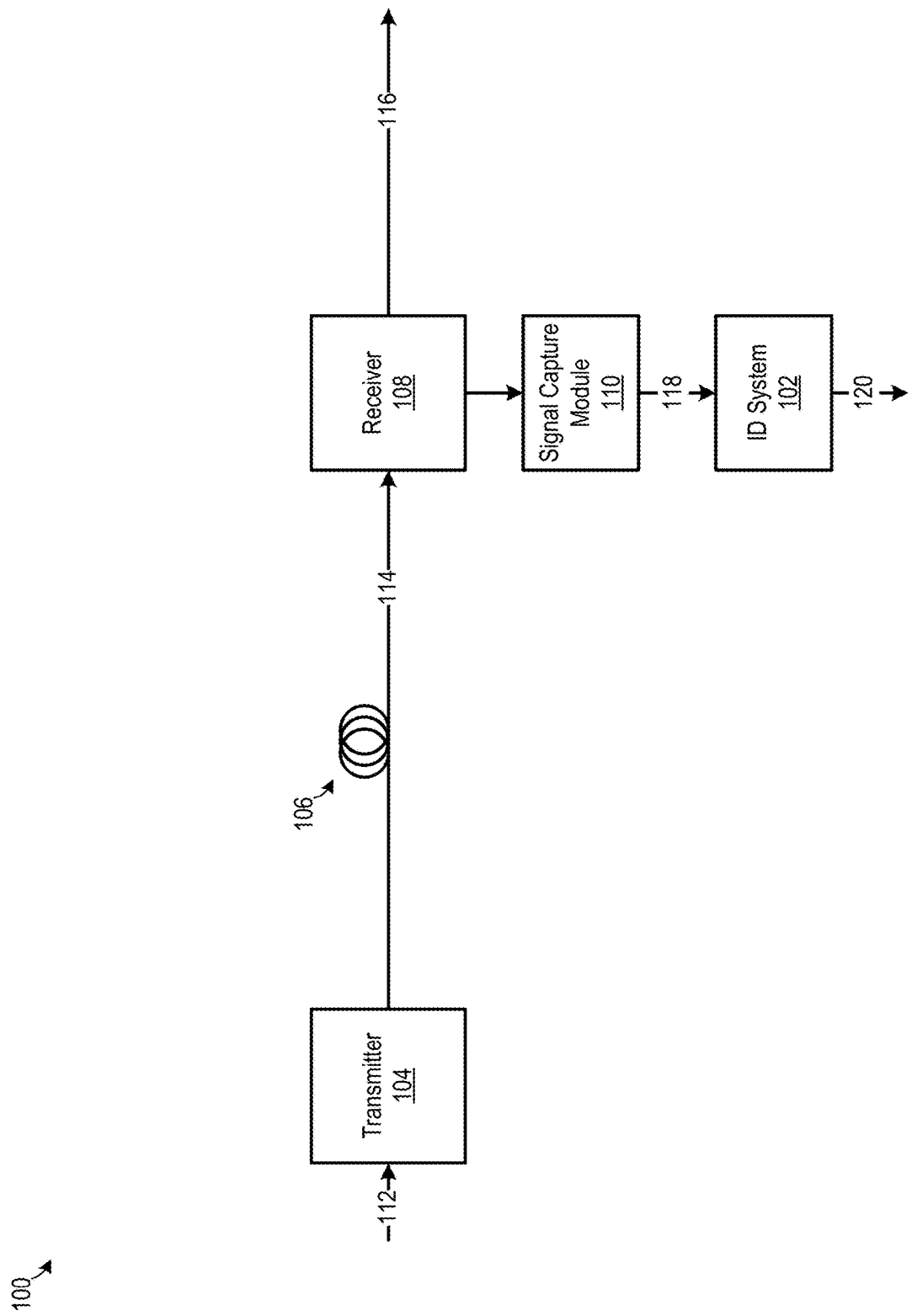
FIG. 1 is a block diagram of a communication network including a system for identifying an impairment of a communication medium, according to an embodiment.

One common impairment of a communication medium is presence of a pair of separated impedance mismatches which causes reflection of communication signals and resulting standing waves. This communication medium impairment is frequently referred to as a standing wave impairment or an "echo tunnel." As an example of a standing wave impairment, consider a coaxial electrical cable communication medium connecting a first node and a second node. A mismatch of respective impedances of the first and second nodes may cause reflection of communication signals transmitted though the coaxial electrical cable and thereby generate standing waves. While small standing waves are normal and can typically be corrected by equalization, large standing waves indicate one or more damaged components and may interfere with use of the coaxial electrical cable for data transmission, especially when transmitting data via high-frequency communication signals. Accordingly, it is desirable to identify and correct any large standing wave impairments of a communication medium.

Another common impairment of a communication medium is presence of unwanted water (or other liquid) in the communication medium, sometimes referred to as a water impairment. For example, consider again a coaxial electrical cable connecting first and second nodes. Presence of water in the coaxial electrical cable will degrade the cable's frequency response, such as by attenuating high-frequency communication signals, thereby interfering with data transmission via the coaxial electrical cable. Accordingly, it is also desirable to identify and correct any damage to a communication medium which may allow water or other liquid to enter the communication medium, thereby causing a water impairment.

Disclosed herein are systems and methods for identifying an impairment of a communication medium, which may substantially simplify identifying and correcting problems in a communication network. For example, some embodiments are configured to automatically determine, from a spectrum response of a communication medium and/or an impulse response of the communication medium, whether an impairment of the communication medium is a standing wave impairment or a water impairment. Such automatic identification of impairment type may significantly facilitate correcting the impairment, thereby promoting user satisfaction as well as economical and efficient communication network maintenance and repair.

For instance, assume a scenario where a communication network user is experiencing degraded service caused by excessive high-frequency attenuation in a communication medium serving the network user. The excessive high-frequency attenuation could be caused by a standing wave impairment, a water impairment, or both types of impairments. Knowledge of whether the impairment is a standing wave impairment or a water impairment may be extremely helpful to a technician tasked with correcting the impairment, by giving the technician an idea of what type of problem to look for when inspecting the communication medium, as well as what portion of the communication medium to inspect. Accordingly, automatic determination of whether the impairment is a standing wave impairment, a water impairment, or both a standing wave impairment and a water impairment may enable the technician to correct the impairment significantly faster than would otherwise be possible, thereby helping minimize network user inconvenience and communication network operator maintenance cost.

FIG. 1 is a block diagram of a communication network 100 including a system 102 for identifying an impairment of a communication medium, where system 102 is one embodiment of the new systems disclosed herein. Communication network 100 further includes a transmitter 104, a communication medium 106, a receiver 108, and a signal capture module 110. Communication medium 106 communicatively couples transmitter 104 and receiver 108. Communication medium 106 is illustrated as being a cable, and communication medium 106 accordingly may be, for example, a coaxial electrical cable, a twisted pair electrical cable (e.g., an Ethernet cable or a telephone cable), an optical cable, a power line cable, etc. However, communication medium 106 is not limited to being a cable, and communication medium 106 could instead be a wireless communication link, such as a radio wireless communication link or a free space optical wireless communication link. Additionally, communication medium 106 could be a hybrid of two or more different types of communication mediums, such as a hybrid optical cable and electrical cable communication medium, or a hybrid cable and wireless communication medium.

Transmitter 104 is configured to receive input communication signals 112 and convert the input communication signals 112 into transmission communication signals 114 for transmission to receiver 108 via communication medium 106. Transmitter 104 is alternately further configured to internally generate input communication signals 112, instead of receiving the input communication signals from an external source. In some embodiments, transmitter 104 is part of, or includes, a cable modem (CM), a cable modem termination system (CMTS), a fiber node, a digital subscriber line (DSL) modem, a digital subscriber line access multiplexer (DSLAM), a remote terminal (RT), an optical network termination (ONT), an optical network unit (ONU), an optical line terminal (OLT), a wireless base station (e.g., cellular, satellite, WiFi, fixed wireless, etc.), a wireless modem, or user equipment (UE). Receiver 108 is configured to receive transmission communication signals 114 via communication medium 106 and convert transmission communication signals 114 into output communication signals 116. In some embodiments, output communication signals 116 represent the same, or substantially the same, data as input communication signals 112. In some embodiments, receiver 108 is part of, or includes, a CM, a CMTS, a fiber node, a DSL modem, a DSLAM, an RT, an ONT, an ONU, an OLT, a wireless base station (e.g., cellular, satellite, WiFi, fixed wireless, etc.), a wireless modem, or UE.

Signal capture module 110 is configured to generate signal data 118 from transmission communication signals 114, where signal data 118 represents a response of communication medium 106. In some embodiments, signal data 118 is a spectrum response of communication medium 106 representing the communication medium in the frequency domain. In these embodiments, signal capture module 110 is configured to generate signal data 118, for example, by taking a Fourier transform, such as a fast Fourier transform (FFT), of a time-domain representation of transmission communication signals 114. In some other embodiments, signal data 118 is an impulse response of communication medium 106 representing the transmission medium in the time domain. In particular embodiments, signal capture module 110 includes a full band capture (FBC) module of a modem or other termination device. Although signal capture module 110 is depicted as being communicatively coupled to receiver 108, signal capture module 110 could alternately be directly coupled to communication medium 106 anywhere along the path of communication medium 106. Additionally, signal capture module 110 could be coupled to transmitter 104, or be part of transmitter 104, without departing from the scope hereof.

System 102, which is henceforth referred to as "ID system" 102, is configured to automatically identify an impairment in communication medium 106, such as a standing wave impairment and/or a water impairment, directly or indirectly from signal data 118. For example, some embodiments of ID system 102 are configured to automatically identify the impairment based at least partially on one or more characteristics of an impulse response of communication medium 106, such as distribution of impulse response coefficients and/or a cumulative distribution function (CDF) of the impulse response, as discussed below. As another example, some embodiments of ID system 102 are configured to automatically identify the impairment at least partially from tilt in a spectrum response of communication medium 106. ID system 102 is further configured to generate an identification signal 120 indicating an impairment identified by ID system 102. For example, ID system 102 could be configured so that identification signal 120 may indicate that (1) a standing wave impairment is present, (2) a water impairment is present, (3) both a standing wave impairment and a water impairment are present, or (4) no impairment is present.

ID system 102 is formed, for example, of analog and/or digital electronic circuitry. In some embodiments, such as discussed below with respect to FIG. 2, ID system 102 includes a processor and a memory, where the processor is configured execute instructions (e.g., software and/or firmware) stored in the memory to perform the functions of ID system 102. Although receiver 108, signal capture module 110, and ID system 102 are depicted as being separate elements, two or more of these elements may be at least partially combined and/or co-packaged. For example, in certain embodiments, signal capture module 110 and ID system 102 share a common processor and/or memory.

Figure 2:
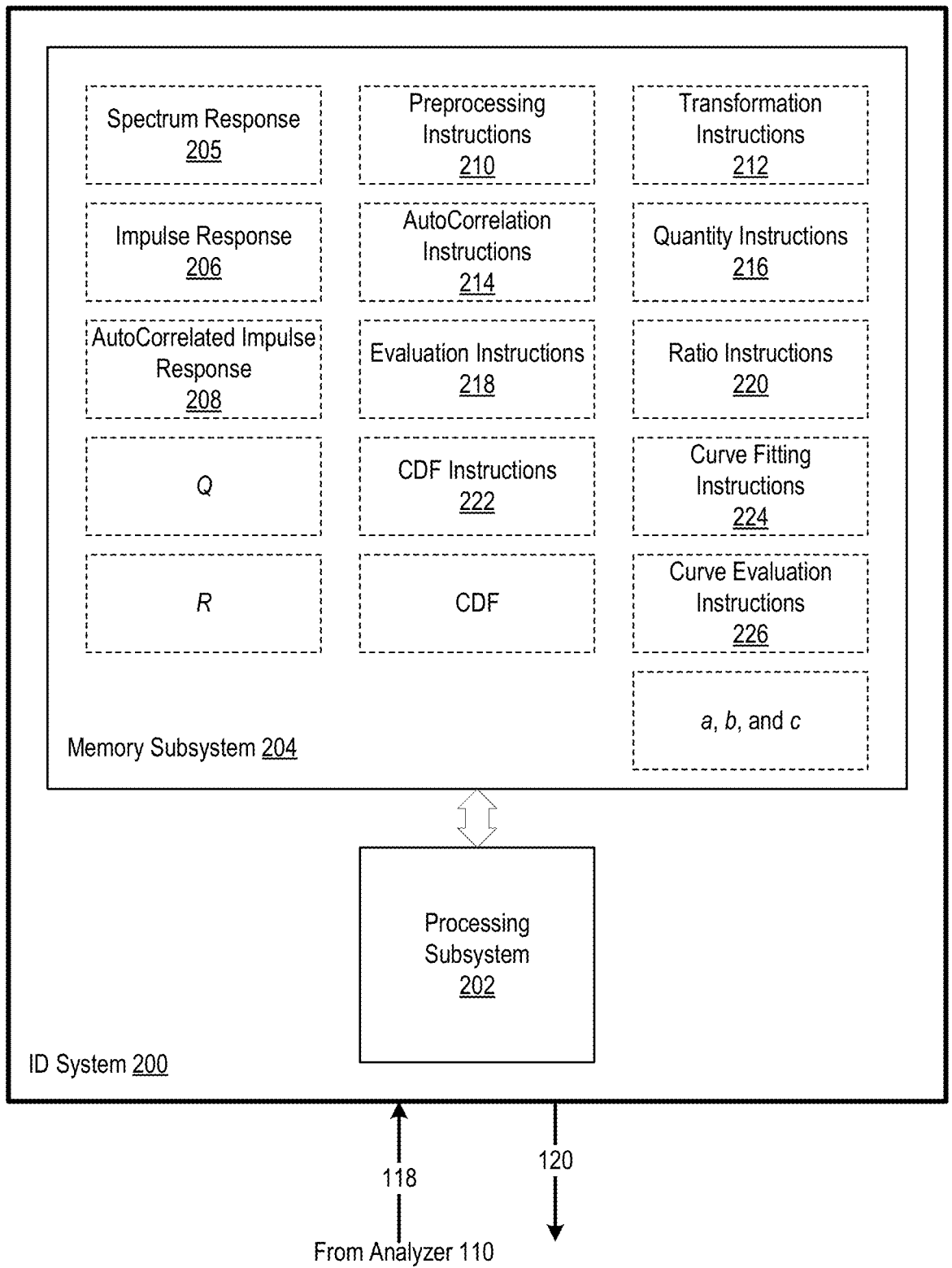
FIG. 2 is a block diagram of an embodiment of the FIG. 1 system for identifying an impairment of a communication medium.

FIG. 2 is a block diagram of an ID system 200, which is one possible embodiment of ID system 102 of FIG. 1.

However, it is understood that ID system 102 is not limited to the FIG. 2 example embodiment.

ID system 200 includes a processing subsystem 202 and a memory subsystem 204. Processing subsystem 202 includes one or more processors (not shown), and processing subsystem 202 is communicatively coupled to memory subsystem 204. Memory subsystem 204 includes one or more memory modules (not shown). All elements of ID system 200 need not be co-packaged or even disposed at single location. For example, in certain embodiments, processing subsystem 202 and memory subsystem 204 are at least partially implemented in a distributed computing environment, such as in a cloud computing environment accessible via the Internet. Memory subsystem 204 stores data and instructions for use by processing subsystem 202 to perform the functions of ID system 200. For example, memory subsystem 204 is depicted as including data in the form of a spectrum response 205, an impulse response 206, an autocorrelated impulse response 208, a quantity Q, a ratio R, a cumulative distribution function CDF, and curve parameters a, b, and c, as well as instructions (e.g., software or firmware) in the form of preprocessing instructions 210, transformation instructions 212, autocorrelation instructions 214, quantity instructions 216, evaluation instructions 218, ratio instructions 220, CDF instructions 222, curve fitting instructions 224, and curve evaluation instructions 226, which are discussed below. However, memory subsystem 204 need not include any or all of the depicted data and instructions; to the contrary, the data and instructions stored in memory subsystem 204 will be implementation dependent. Furthermore, some functions of ID system 200 could alternately be performed by dedicated analog and/or digital electronic circuitry instead of processing subsystem 202 executing instructions stored in memory subsystem 204.

Figure 3:
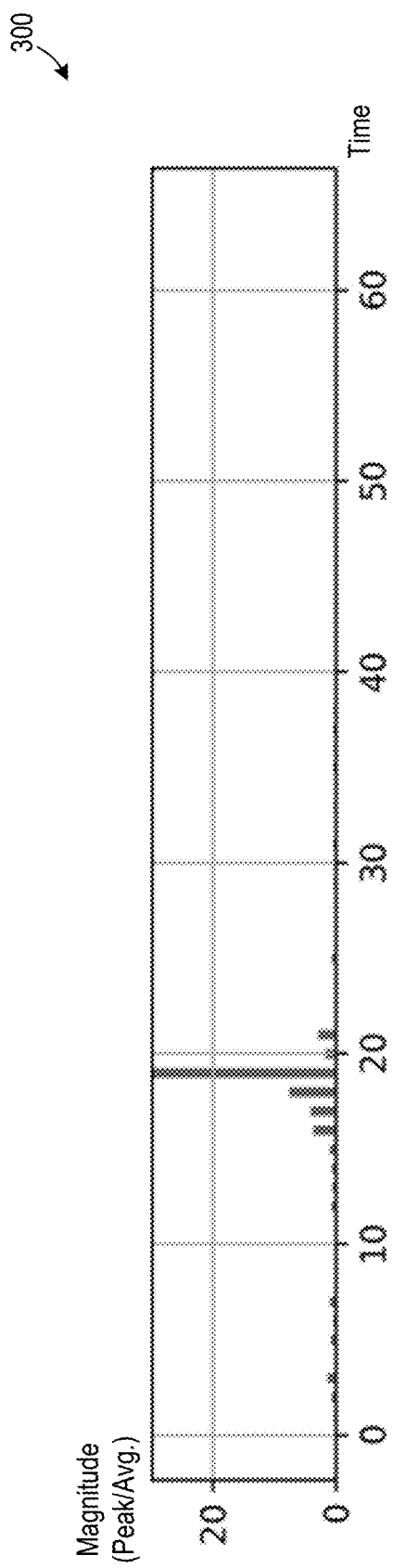
FIG. 3 is a graph of magnitude versus time of a filtered autocorrelated impulse response of a coaxial electrical cable having a standing wave impairment.
Figure 4:
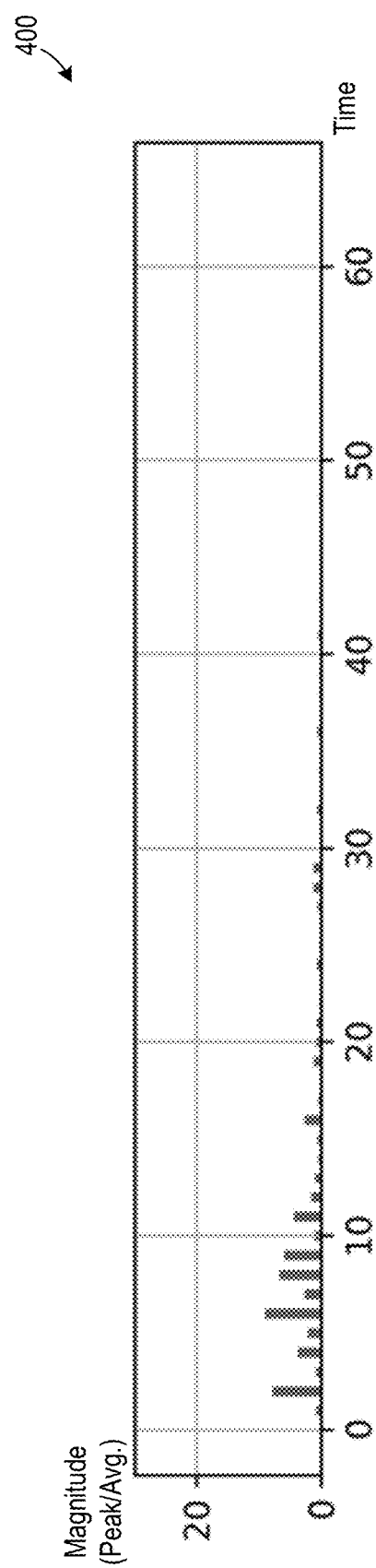
FIG. 4 is a graph of magnitude versus time of a filtered autocorrelated impulse response of a coaxial electrical cable having a water impairment.

Referring again to FIG. 1, Applicant has found that a standing wave impairment of communication medium 106 and a water impairment of communication medium 106 can be distinguished at least partially based on or more characteristics of an impulse response of communication medium 106. For example, FIGS. 3 and 4 are graphs 300 and 400, respectively, of magnitude versus time of filtered autocorrelated impulses responses of a coaxial electrical cable. The magnitude of each autocorrelated impulse response coefficient of the two graphs is expressed as a ratio of a peak value to an average value. Graph 300 corresponds to a coaxial electrical cable having a standing wave impairment, and graph 400 corresponds to a coaxial electrical cable having a water impairment. As evident when comparing graphs 300 and 400, the two autocorrelated impulse responses have significantly different distributions. Specifically, the autocorrelated impulse response associated with the standing wave impairment (graph 300) has a large peak coefficient and several small coefficients close in time to the peak coefficient. The autocorrelated impulse response associated with the water impairment (graph 400), in contrast, has numerous smaller coefficients significantly distributed over time. Accordingly, a standing wave impairment of a communication medium and a water impairment of a communication medium can be distinguished by a distribution of coefficients of their respective impulse responses. Specifically, most power of an impulse response associated with a standing wave impairment is concentrated in a few, e.g., one, two, or three, impulse response coefficients. In contrast, impulse response power associated with a water impairment is distributed among many impulse response coefficients, which is thought to be caused by how water is distributed in the coaxial electrical cable.

Figure 5:
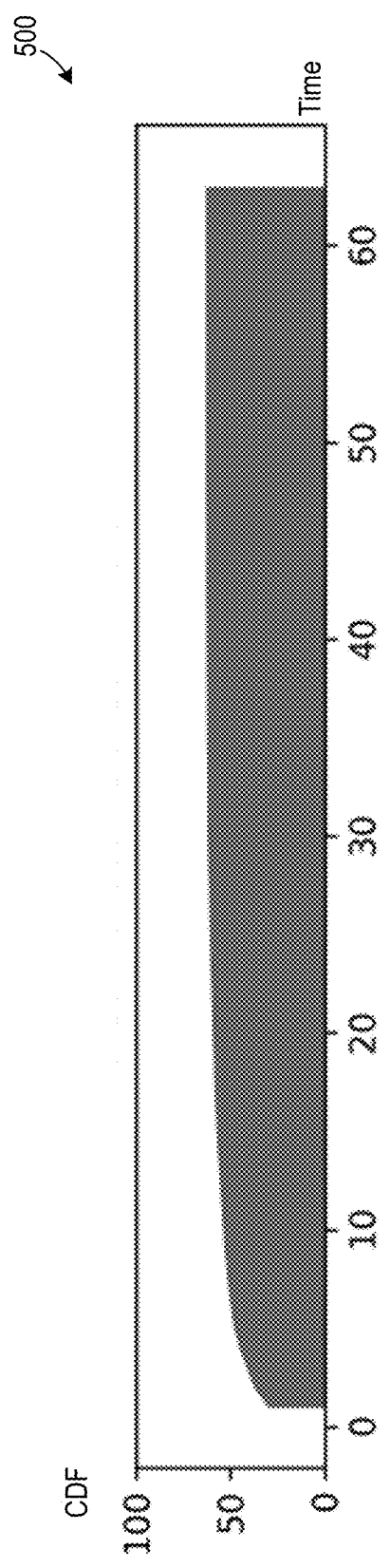
FIG. 5 is a graph of a cumulative distribution function of a filtered impulse response of a coaxial electrical cable having a standing wave impairment.
Figure 6:
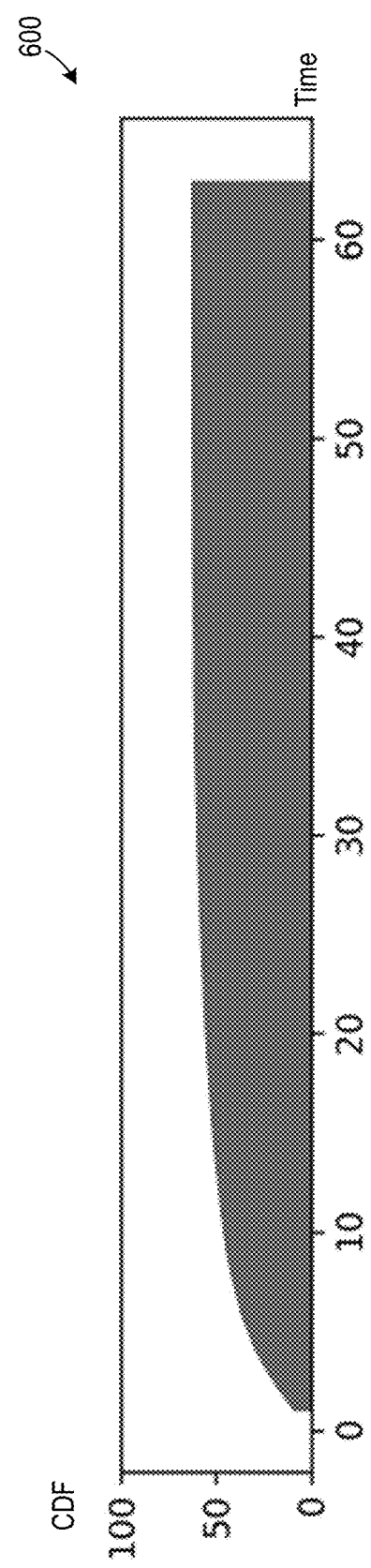
FIG. 6 is a graph of a cumulative distribution function of a filtered impulse response of a coaxial electrical cable having a water impairment.

As another example, FIGS. 5 and 6 are graphs 500 and 600, respectively, of CDFs of impulse responses. Graph 500 corresponds to a coaxial electrical cable having a standing wave impairment, and graph 600 corresponds to a coaxial electrical cable having a water impairment. As evident when comparing graphs 500 and 600, the two CDFs have significantly different shapes. Specifically, the CDF associated with the standing wave impairment (FIG. 5) has a large initial rise and a relatively small subsequent rate of rise. The CDF associated with the water impairment (FIG. 6), in contrast, has a smaller initial rise than the FIG. 5 CDF, but the FIG. 6 CDF has a larger subsequent rate of rise than the FIG. 5 CDF. Accordingly, a standing wave impairment of a communication medium and a water impairment of a communication medium may be distinguished from the shape of their respective impulse response CDFs.

Moreover, a water impairment of a communication medium can potentially be identified from tilt in a spectrum response of the communication medium. Specifically, presence of tilt in a spectrum response typically indicates a water impairment in a significant portion of the communication medium, as presence of water increases attenuation of high-frequency signals traveling through the communication medium.

Accordingly, some embodiments of ID system 102 are configured to automatically identify an impairment in communication medium 106 at least partially based on one or more of (1) a distribution of coefficients of an impulse response of communication medium 106, (2) a CDF of an impulse response of communication medium 106, and (3) tilt in a spectrum response of communication medium. Disclosed below with respect to FIGS. 7-22 are several examples of how ID system 102 could be configured to automatically identify an impairment of communication medium 106 in one or more of these manners. However, ID system 102 is not limited to these example configurations.

Figure 7:
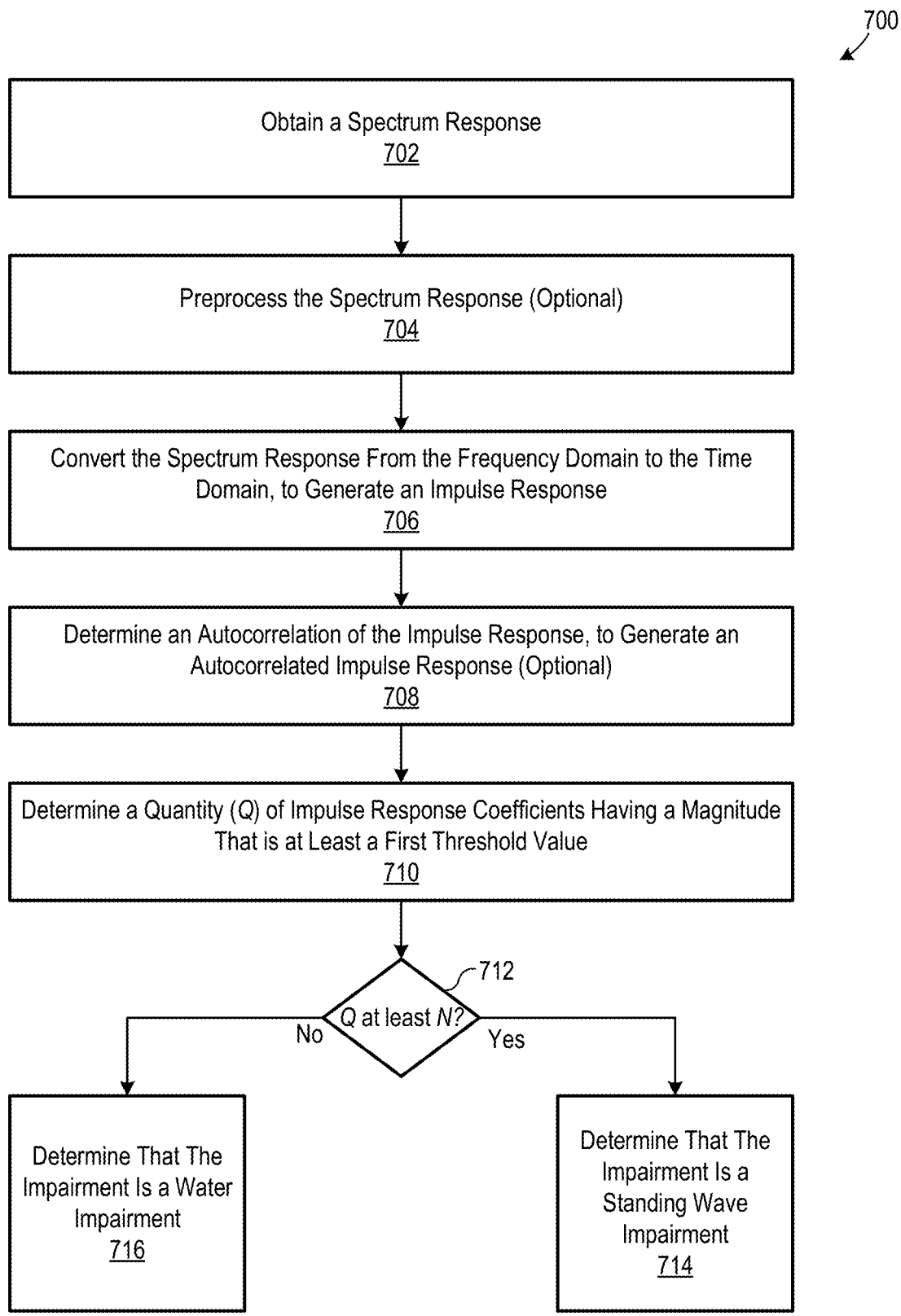
FIG. 7 is a flow chart of a method for automatically identifying an impairment of a communication medium, according to an embodiment.

FIG. 7 is a flow chart of a method 700 for automatically identifying an impairment of a communication medium. In a block 702 of method 700, a spectrum response is obtained. In one example of block 702, ID system 200 (FIG. 2) receives spectrum response from signal capture module 110 via signal data 118, and processing subsystem 202 stores the spectrum response in memory subsystem 204 as spectrum response 205. In an optional block 704 of method 700, the spectrum response is preprocessed, e.g., filtered, to reduce or eliminate features that may interfere with identifying an impairment from the spectrum response. In one example of block 704, processing subsystem 202 executes preprocessing instructions 210 to preprocess spectrum response 205. Preprocessing spectrum response 205 includes, for example, filtering spectrum response 205, such as by flattening spectrum response 205, interpolating portions of spectrum response 205, and removal of tilt from spectrum response 205.

Figure 8:
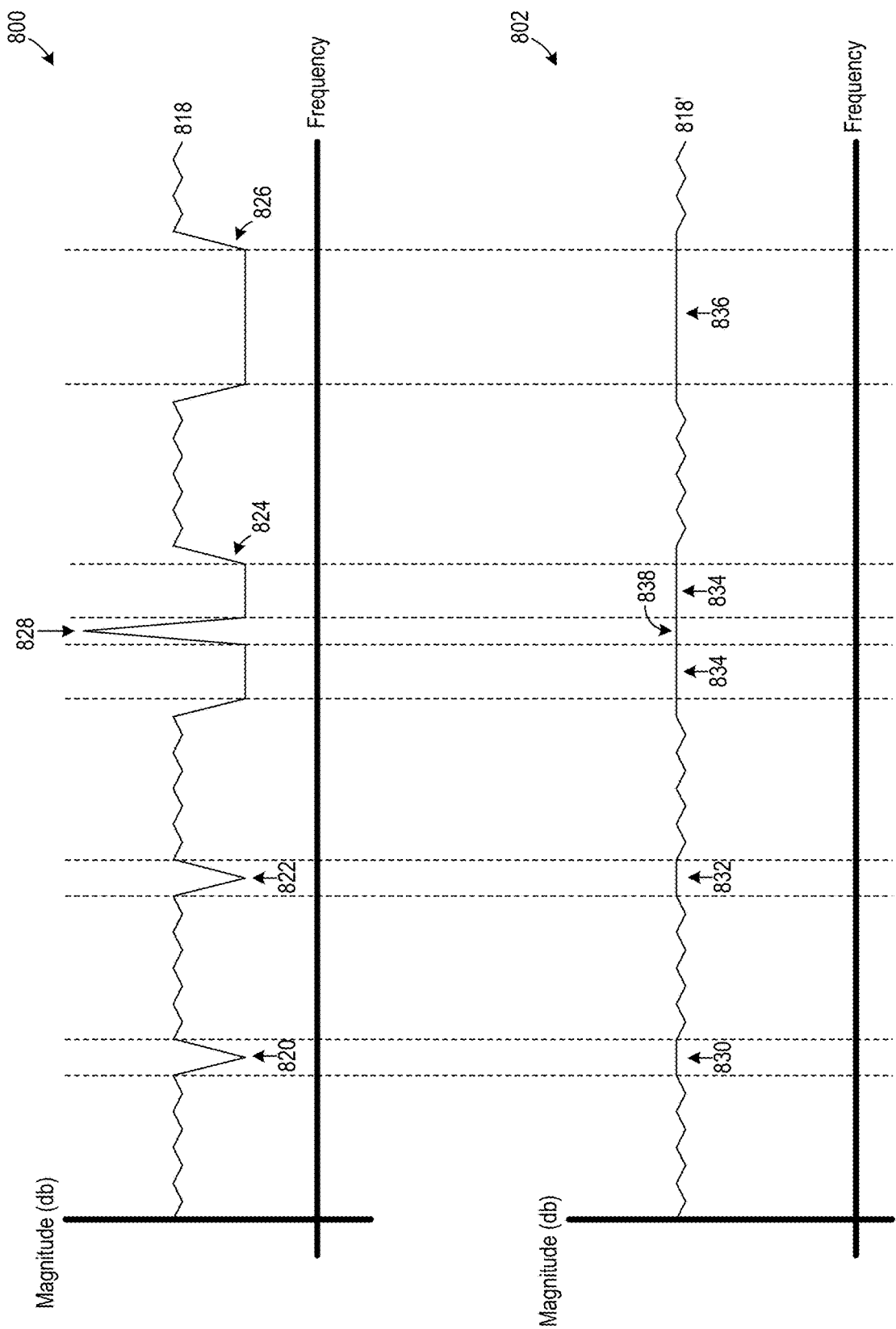
FIG. 8 includes two graphs collectively illustrating one example of how the FIG. 2 system could preprocess a spectrum response.

FIG. 8 includes graphs 800 and 802 collectively illustrating one example of how ID system 200 may preprocess a spectrum response. Graph 800 includes a curve representing a spectrum response 818, which is an example of spectrum response 205. Graph 802 includes a curve representing spectrum response 818', which is spectrum response 818 after preprocessing by ID system 200. In each of graphs 800 and 802, a vertical axis represents magnitude, and a horizontal axis represents frequency. Each of graphs 800 and 802 has a common frequency scale. Spectrum response 808 includes notches 820, 822, 824, and 826 as well as a spike 828. Notches 820, 822, 824, and 826 represent, for example, dropout between adjacent modulated carrier signals in frequency (e.g., dropout between adjacent quadrature amplitude modulated carrier signals), and spike 828 represents, for example, a pilot carrier of communication signals 114. In this example, processing subsystem 202 executes preprocessing instructions 210 to preprocess spectrum response 818 by (1) replacing notches 820, 822, 824, and 826 with interpolated portions 830, 832, 834, and 836, respectively, and (2) flatten spectral response 818 by clipping spike 828 and replacing it with an interpolated portion 838. Consequently, spectral response 818' is filtered, i.e., it is free of notches and spikes, that may interfere with identifying an impairment of communication medium 106 from the spectrum response.

Referring again to FIG. 7, in a block 706 of method 700, the spectrum response is converted from the frequency domain to a time domain, to generate an impulse response. In embodiments of method 700 including optional block 704, the spectrum response converted in block 706 is the spectrum response received in block 702 after being preprocessed in block 704. In embodiments of method 700 omitting block 704, the spectrum response converted in block 706 is the spectrum response obtained in block 702 without preprocessing. In some embodiments of block 706, the spectrum response is converted from the frequency domain to the time domain by performing an inverse Fourier transform, such as an inverse fast Fourier transform (iFFT), of the spectrum response. In one example of block 706, processing subsystem 202 executes transformation instructions 212 to convert spectrum response 205 from the frequency domain to the time domain, to generate impulse response 206. In some embodiments, spectrum response 205 is a scalar spectrum response including only magnitude values (no phase), and in these embodiments, transformation instructions 212 optionally convert spectrum response 205 from a scalar spectrum response to a complex spectrum response by assigning each spectrum response value an imaginary coefficient of zero (or some other constant), before performing an inverse Fourier transform of spectrum response 205. Such conversion of spectrum response 205 for scalar to complex values enables use of an inverse Fourier transform technique, such as a Discrete Fourier Transform, requiring both a real component and an imaginary component in the frequency domain. The resulting Fourier transform of spectrum response 205 will include a mirror image in the time domain, and one half of the coefficients can accordingly be discarded to generate impulse response 206. In some other embodiments where spectrum response 205 is a scalar spectrum response, transformation instructions 212 use a real-only Fourier transform that does not require imaginary components in the frequency domain, thereby eliminating the need for a complex spectrum response in block 706. If complex spectral values are available, zero stuffing is not required to perform an iFFT, In an optional block 708 of method 700, an autocorrelation of the impulse response is determined, to generate an autocorrelated impulse response. In one example of block 708, processing subsystem 202 executes autocorrelation instructions 214 to determine an autocorrelation of impulse response 206 to generate an autocorrelated impulse response 208. Performing an autocorrelation of the impulse response may make it easier to distinguish a standing wave impairment from a water impairment based on the impulse response. Specifically, performing an autocorrelation of an impulse response including only a single coefficient does not change the number of coefficients, but performing an autocorrelation of an impulse response including multiple coefficients increases the number of coefficients. Thus, performing an autocorrelation of an impulse response further increases the difference in number of coefficients between an impulse response associated with a standing wave impairment and an impulse response associated with a water impairment, thereby making it easier to distinguish between the two types of impairments.

In a block 710 of method 700, a quantity (Q) of impulse response coefficients having a magnitude that is at least a threshold value is determined. In embodiments of method 700 including optional block 708, the impulse response coefficients considered in block 710 are coefficients of the autocorrelated impulse response generated in block 708. In embodiments of method 700 omitting optional block 708, the impulse response coefficients considered in block 710 are coefficients of the impulse response generated in block 706 without autocorrelation. In one example of block 710, processing subsystem 202 executes quantity instructions 216 to determine Q, and processing subsystem 202 stores Q in memory subsystem 204.

Figure 9:
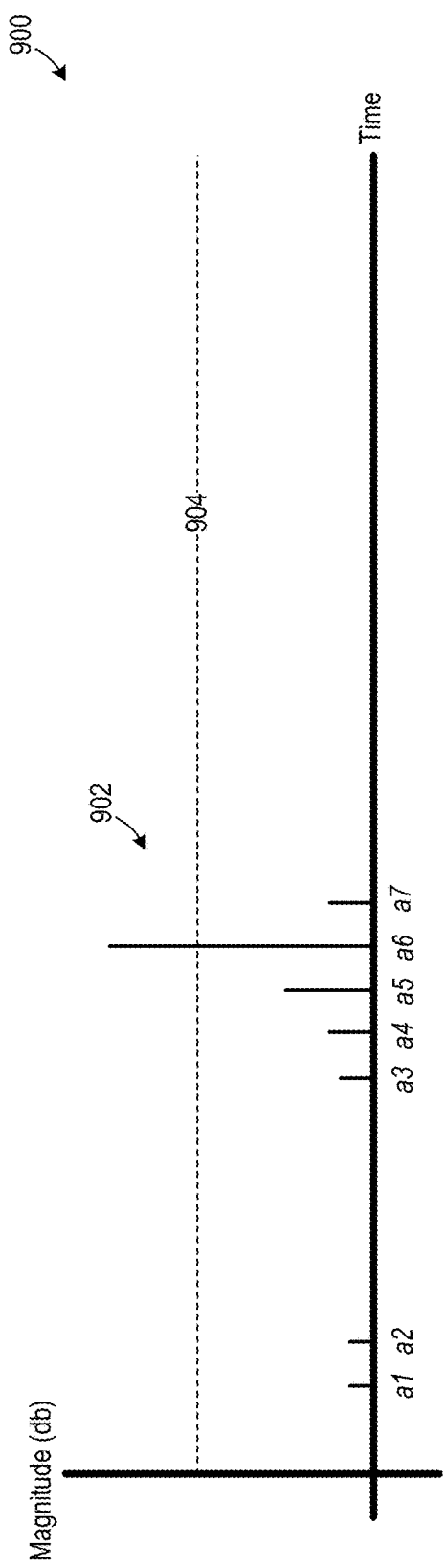
FIG. 9 is a graph illustrating an example autocorrelated impulse response corresponding to a standing wave impairment.
Figure 10:
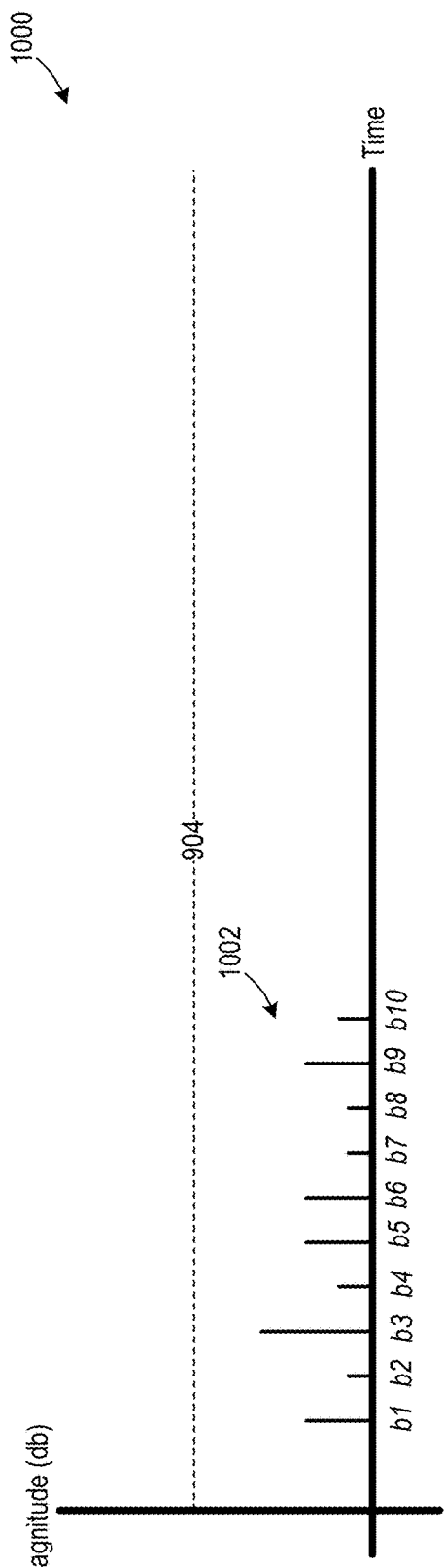
FIG. 10 is a graph illustrating an example autocorrelated impulse response corresponding to a water impairment.

FIGS. 9 and 10 are graphs 900 and 1000, respectively, illustrating two different example scenarios addressed in block 710. In each of graphs 900 and 1000, the vertical axis represents magnitude and the horizontal axis represents time. Graph 900 illustrates an autocorrelated impulse response 902 including coefficients a1-a7, where autocorrelated impulse response 902 is an example of autocorrelated impulse response 208 corresponding to a standing wave impairment. In this example, processing subsystem 202 determines that one coefficient, i.e., coefficient a6, has a magnitude that is at least a first threshold value 904. Accordingly, processing subsystem 202 determines that Q is equal to one in this example. Graph 1000, on the other hand, illustrates an autocorrelated impulse response 1002 including coefficients b1-b10, where autocorrelated impulse response 1002 is an example of autocorrelated impulse response 208 corresponding to a water impairment. In this example, processing subsystem 202 determines that no coefficient has a magnitude that is at least first threshold value 904. Accordingly, Q is equal to zero in the FIG. 10 example. First threshold value 904 is set in these examples to be larger than the magnitude of the majority of impulse response coefficients, such that Q represents a number of coefficients having large magnitudes. In some embodiments, first threshold value 904 is fixed, while in some other embodiments, first threshold value 904 is dynamic, such as a predetermined percentage of a largest coefficient or a function of an average magnitude of all coefficients.

A decision block 712 of method 700 determines whether Q is at least a second threshold value N, where N is an integer. N is, for example, one, two, or three. In one example of decision block 712, processing subsystem 202 executes evaluation instructions 218 to determine whether Q is at least one. Presence of impulse response coefficients having a large magnitude indicates presence of a standing wave impairment, while lack of impulse response coefficients having a large magnitude indicates presence of a water impairment. Accordingly, if the result of decision block 712 is yes, method 700 proceeds to block 714 and determines that the impairment is a standing wave impairment. On the other hand, if the result of decision block 712 is no, method 700 proceeds to block 716 and determines that the impairment is a water impairment. In one example of block 714, processing subsystem 202 determines that the impairment is a standing wave impairment in response to Q being at least one, and processing subsystem 202 generates identification signal 120 indicating that an impairment of communication medium 106 is a standing wave impairment. In one example of block 716, processing subsystem 202 determines that the impairment is a water impairment in response to Q not being at least one, and processing subsystem 202 generates identification signal 120 indicating that an impairment of communication medium 106 is a water impairment.

As discussed above, in some embodiments, signal data 118 generated by signal capture module 110 includes an impulse response of communication medium 106, such that it is unnecessary to generate an impulse response in method 700. Accordingly, in an alternate embodiment of method 700, blocks 702-706 are omitted, and method 700 begins either at optional block 708 (if included) or at block 710, using an impulse response included in signal data 118.

As discussed above, power of an impulse response associated with a water impairment is typically spread over more coefficients than power of an impulse response associated with a standing wave impairment. Accordingly, some embodiments of ID system 200 are configured to identify an impairment of a communication medium at least partially based on a quantity Q of coefficients of an impulse response of the communication medium.

Figure 11:
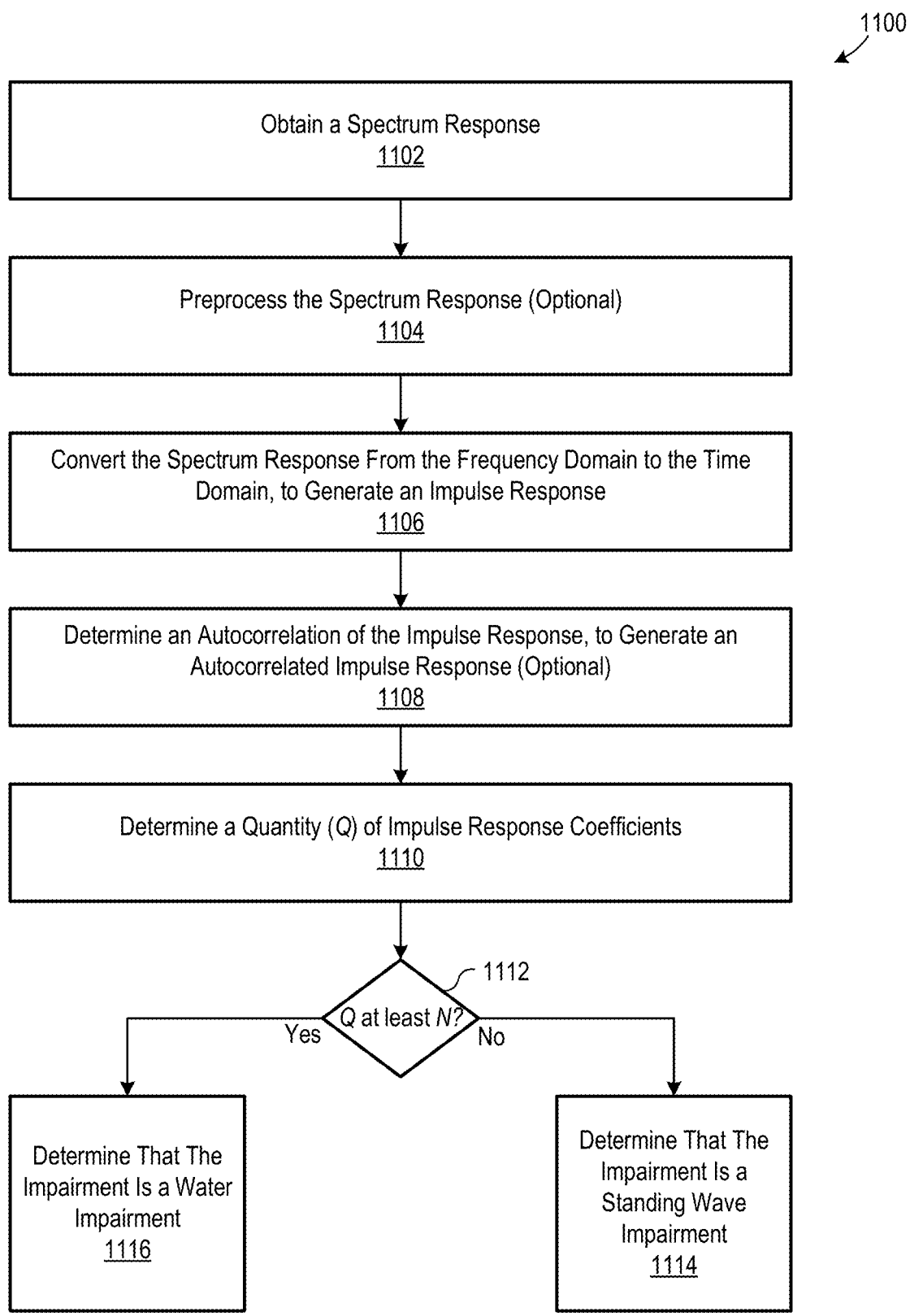
FIG. 11 is a flow chart of another method for automatically identifying an impairment of a communication medium, according to an embodiment.

For example, FIG. 11 is a block diagram of a method 1100 for automatically identifying an impairment of a communication medium. Method 1100 includes blocks 1102, 1104, 1106, and 1108, which are the same as blocks 702, 704, 706, and 708, respectively, of method 700 of FIG. 7. Additionally, blocks 1104 and 1108 are optional. Method 1100 proceeds from block 1108 to block 1110, or from block 1106 to block 1110 if block 1108 is omitted. In block 1110, a quantity (Q) of impulse response coefficients is counted. In embodiments of method 1100 including optional block 1108, the impulse response coefficients counted in block 1110 are coefficients of the autocorrelated input response generated in block 1108. In embodiments of method 1100 omitting optional block 1108, the impulse response coefficients counted in block 1110 are coefficients of the impulse response generated in block 1106 without autocorrelation. In certain embodiments, a magnitude of an impulse response coefficient must be at least a minimum threshold value for the coefficient to be counted when determining Q, such as to prevent inadvertently counting noise as an impulse response coefficient. In one example of block 1110, processing subsystem 202 executes quantity instructions 216 to determine Q, and processing subsystem 202 stores Q in memory subsystem 204.

Figure 12:
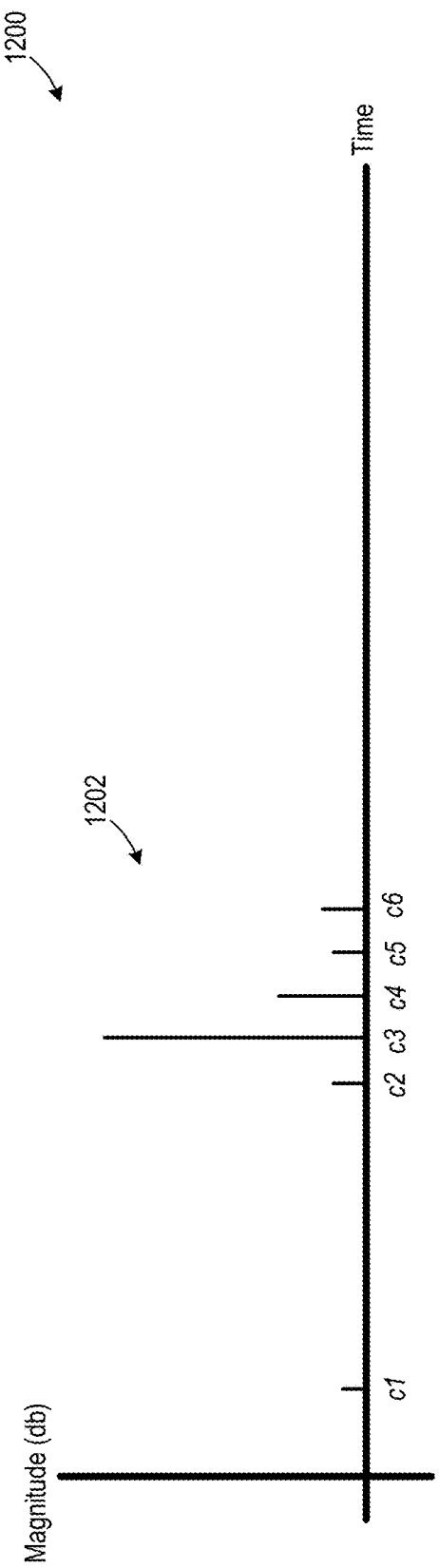
FIG. 12 is a graph illustrating another example autocorrelated impulse response corresponding to a standing wave impairment.
Figure 13:
FIG. 13 is graph illustrating another example autocorrelated impulse response corresponding to a water impairment.

FIGS. 12 and 13 are graphs 1200 and 1300, respectively, illustrating two different examples scenarios addressed in block 1110. In each of graphs 1200 and 1300, the vertical axis represents magnitude and the horizontal axis represents time. Graph 1200 illustrates an autocorrelated impulse response 1202 including coefficients c1-c6, where autocorrelated impulse response 1202 is another example of autocorrelated impulse response 208 corresponding to a standing wave impairment. In this example, processing subsystem 202 determines that autocorrelated impulse response 1202 has six coefficients. Accordingly, processing subsystem 202 determines that Q is equal to six in this example. Graph 1300, on the other hand, illustrates an autocorrelated impulse response 1302 including coefficients d1-d12, where autocorrelated impulse response 1302 is another example of autocorrelated impulse response 208 corresponding to a water impairment. In this example, processing subsystem 202 determines that autocorrelated impulse response 1302 has twelve coefficients. Accordingly, Q is equal to twelve in the FIG. 13 example.

A decision block 1112 of method 1100 determines whether Q is at least a threshold value N, where N is an integer. N is chosen delineate an impulse response associated with a standing wave impairment from an impulse response associated with a water impairment. N is equal to 10 in the following discussion, but N is not limited to this value. In one example of decision block 1112, processing subsystem 202 executes evaluation instructions 218 to determine whether Q is at least 10. If the result of decision block 1112 is no, method 1100 proceeds to block 1114 and determines that the impairment is a standing wave impairment. On the other hand, if the result of decision block 1112 is yes, method 1100 proceeds to block 1116 and determines that the impairment is a water impairment. In one example of block 1114, processing subsystem 202 determines that the impairment is a standing wave impairment in response to Q not being at least 10 (such as in the FIG. 12 example scenario), and processing subsystem 202 generates identification signal 120 indicating that an impairment of communication medium 106 is a standing wave impairment. In one example of block 1116, processing subsystem 202 determines that the impairment is a water impairment in response to Q being at least 10 (such as in the FIG. 13 example scenario), and processing subsystem 202 generates identification signal 120 indicating that an impairment of communication medium 106 is a water impairment. In an alternate embodiment of method 1100, blocks 1102-1106 are omitted, and method 1100 begins at either optional block 1108 or at block 1110, using an impulse response included in signal data 118.

Figure 14:
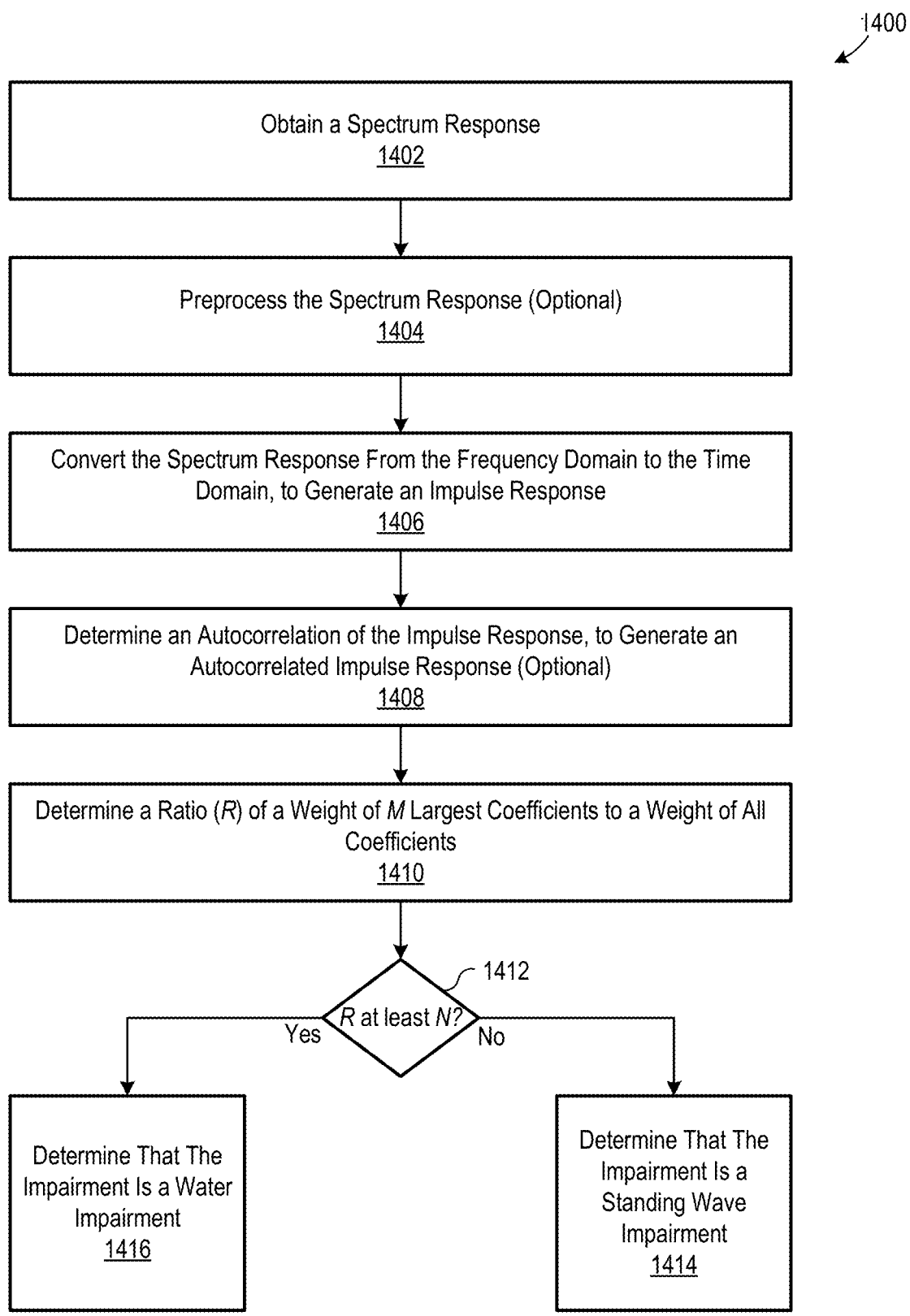
FIG. 14 is a flow chart of another method for automatically identifying an impairment of a communication medium, according to an embodiment.

Some embodiments of ID system 200 are configured to identify an impairment of a communication medium at least partially based on power of one or more largest coefficients of an impulse response relative to total power of all coefficients of the impulse response. For example, FIG. 14 is a block diagram of a method 1400 for automatically identifying an impairment of a communication medium. Method 1400 includes blocks 1402, 1404, 1406, and 1408, which are the same as blocks 702, 704, 706, and 708, respectively, of method 700 of FIG. 7. Additionally, blocks 1404 and 1408 are optional. Method 1400 proceeds from block 1408 to block 1410, or from block 1406 to block 1410 if block 1408 is omitted. In block 1410, a ratio (R) is determined, where R is a ratio of (1) a sum of magnitudes of all but M largest coefficients of the impulse response to (2) a sum of magnitudes of all coefficients of the impulse response, where M is an integer greater than or equal to one. In some embodiments, M is equal to one, two, or three. In embodiments of method 1400 including optional block 1408, the impulse response considered in block 1410 is the autocorrelated input response generated in block 1408. In embodiments of method 1400 omitting optional block 1408, the impulse response considered in block 1410 is the impulse response generated in block 1406 without autocorrelation. In one example of bock 1410, processing subsystem 202 executes ratio instructions 220 to determine R, and processing subsystem 202 stores R in memory subsystem 204.

Figure 15:
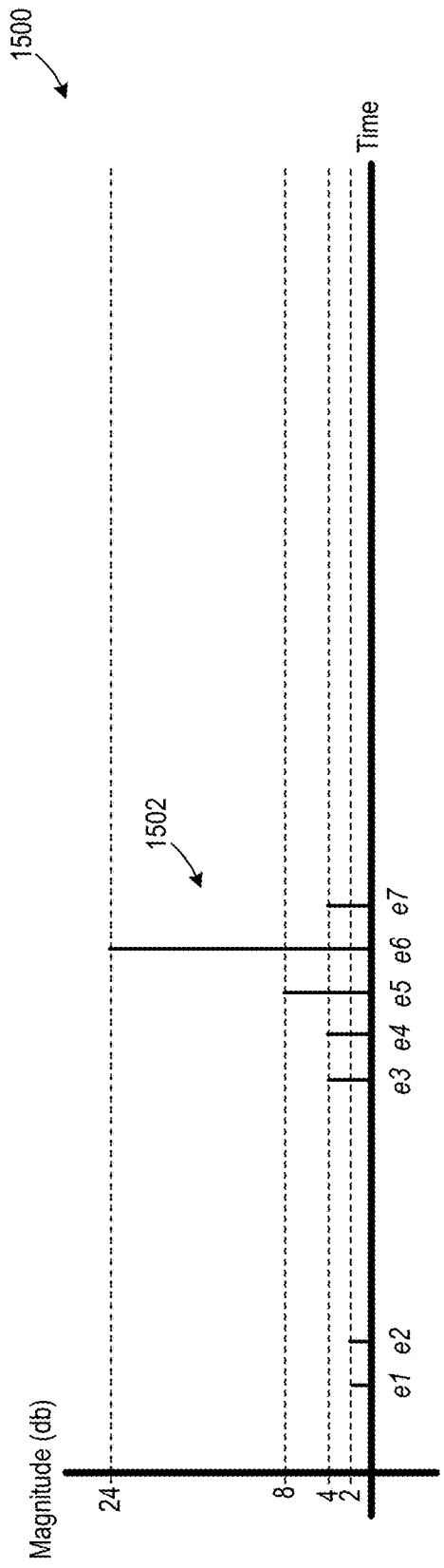
FIG. 15 is a graph illustrating another example autocorrelated impulse response corresponding to a standing wave impairment.
Figure 16:
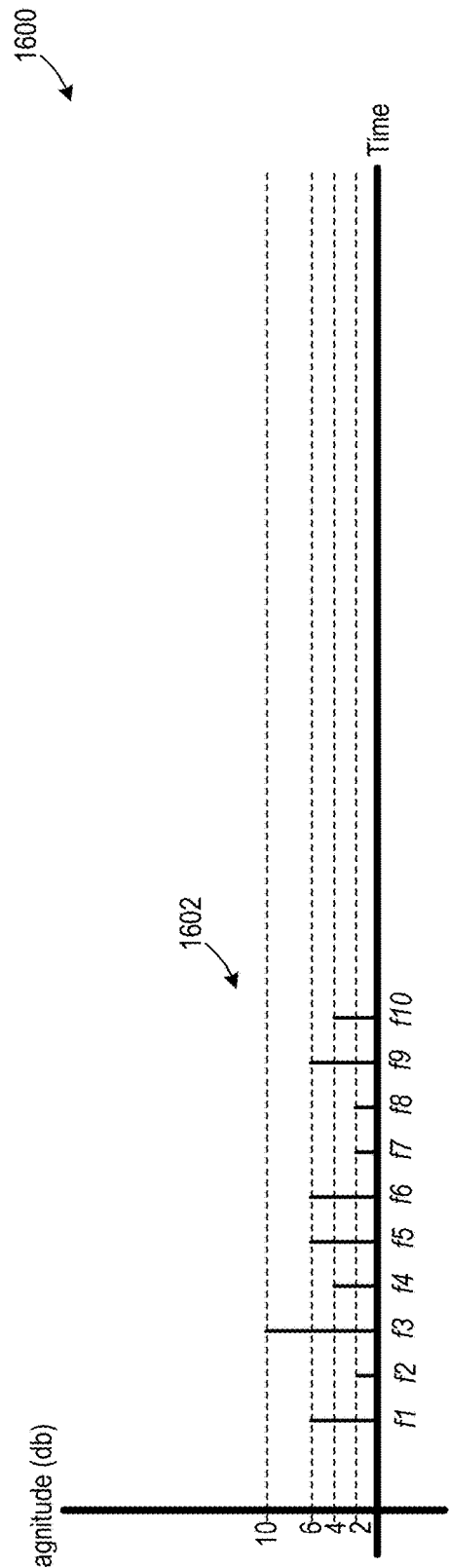
FIG. 16 is a graph illustrating another example autocorrelated impulse response corresponding to a water impairment.

FIGS. 15 and 16 are graphs 1500 and 1600, respectively, illustrating two different examples scenarios addressed in block 1410. In each of graphs 1500 and 1600, the vertical axis represents impulse coefficient magnitude and the horizontal axis represents time. Graph 1500 illustrates an autocorrelated impulse response 1502 corresponding to a standing wave impairment and including coefficients e1-e7, where autocorrelated impulse response 1502 is another example of autocorrelated impulse response 208. Coefficients e1, e2, e3, e4, e5, e6, and e7 have magnitudes 2, 2, 4, 4, 8, 24, and 4, respectively, as illustrated in FIG. 15.

Assuming that M is equal to one, impulse response 1502 has a ratio R as given by EQN. 1 below.

$$R = \frac{2+2+4+4+8+4}{2+2+4+4+8+24+4} = \frac{24}{48} = 0.5 \quad \text{(EQN. 1)}$$

Graph 1600 illustrates an autocorrelated impulse response 1602 corresponding to a water impairment and including coefficients f1-f10, where autocorrelated impulse response 1602 is another example of autocorrelated impulse response 208. Coefficients f1, f2, f3, f4, f5, f6, f7, f8, f9, and f10 have magnitudes 6, 2, 10, 4, 6, 6, 2, 2, 6, and 4, respectively, as illustrated in FIG. 16. Assuming again that M is equal to one, impulse response 1602 has a ratio R as given by EQN. 2 below.

$$R = \frac{6+2+4+6+6+2+2+6+4}{6+2+10+4+6+6+2+2+6+4} = \frac{38}{48} = 0.8 \quad \text{(EQN. 2)}$$

As evident from EQNS. 1 and 2, autocorrelated impulse response 1502 has a significantly smaller ratio R than autocorrelated impulse response 1602. Accordingly, a power of a largest coefficient (coefficient e6) of autocorrelated impulse response 1502 is a large portion of total power of all coefficients of autocorrelated impulse response 1502. In contrast, the relatively large value of ratio R for impulse response 1602 indicates that a power of a largest coefficient (coefficient f3) of impulse response 1602 is a relatively small portion of total power of all coefficients of autocorrelated impulse response 1602. Such power characteristics of impulse responses 1502 and 1602 are consistent with the impulse responses being associated with a standing wave impairment and a water impairment, respectively.

It should be noted that while impulse response coefficients are complex values, the magnitudes of graphs 1500 and 1600, as well as the corresponding magnitudes of EQNS. 1 and 2, are scaler values. Each magnitude value is determined, for example, by taking the square root of the sum of (1) the square of the real part of the corresponding impulse response coefficient and (2) the square of the imaginary part of the corresponding impulse response coefficient.

Referring again to FIG. 14, a decision block 1412 of method 1400 determines whether R is at least a threshold value N. N is chosen to delineate an impulse response associated with a standing wave impairment from an impulse response associated with a water impairment. N is equal to 0.65 in the following discussion, but N is not limited to this value. In one example of decision block 1412, processing subsystem 202 executes evaluation instructions 218 to determine whether R is at least 0.65. If the result of decision block 1412 is no, method 1400 proceeds to block 1414 and determines that the impairment is a standing wave impairment. On the other hand, if the result of decision block 1412 is yes, method 1400 proceeds to block 1416 and determines that the impairment is a water impairment. In one example of block 1414, processing subsystem 202 determines that the impairment is a standing wave impairment in response to R not being at least 0.65 (such as in the FIG. 15 and EQN. 1 example scenario above), and processing subsystem 202 generates identification signal 120 indicating that an impairment of communication medium 106 is a standing wave impairment. In one example of block 1416, processing subsystem 202 determines that the impairment is a water impairment in response to N being at least 0.65 (such as in the FIG. 16 and EQN. 2 example scenario above), and processing subsystem 202 generates identification signal 120 indicating that an impairment of communication medium 106 is a water impairment. In an alternate embodiment of method 1400, blocks 1402-1406 are omitted, and method 1400 begins at either optional block 1408 or at block 1410, using an impulse response included in signal data 118.

Method 1400 could be modified to determine a different ratio or function in block 1410, as long as the different ratio specifies total power of a subset of coefficients of the impulse response to total power of all coefficients of the impulse response (or vice versa). For example, in an alternate embodiment of method 1400, ratio R of block 1410 is a ratio of (1) sum of the magnitudes of M largest coefficients of the impulse response to (2) sum of the magnitudes of all coefficients of the impulse response. In this alternate embodiment, ratio R is given by EQNS. 3 and 4 below for the examples of FIGS. 15 and 16, respectively, assuming that M is again equal to one. As evident from EQNS. 3 and 4, autocorrelated impulse response 1502 has a significantly larger ratio R than autocorrelated impulse response 1602 with this alternative form of ratio R, and decision step 1412 is therefore modified so that (a) method 1400 proceeds to block 1414 if result of decision step 1412 is yes, and (b) method 1400 proceeds to decision block 1416 is the result of decision step 1412 is no.

$$R = \frac{24}{2+2+4+4+8+24+4} = \frac{24}{48} = 0.5 \quad \text{(EQN. 3)}$$

$$R = \frac{10}{6+2+10+4+6+6+2+2+6+4} = \frac{10}{48} = 0.2 \quad \text{(EQN. 4)}$$

Figure 17:
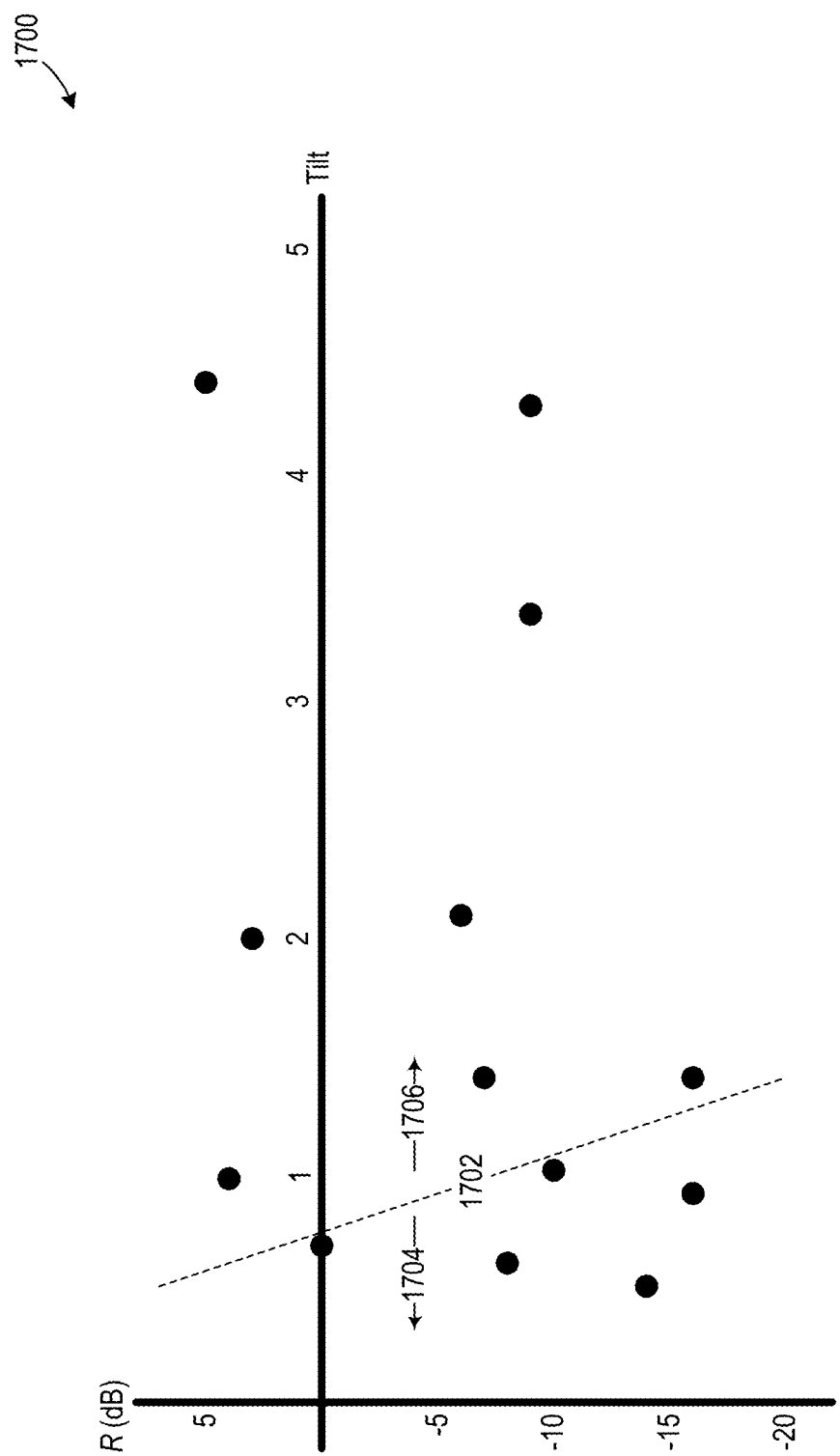
FIG. 17 is a graph of a power ratio versus tilt for several spectrum responses.

Additionally, decision block 1412 could be modified to consider one or more parameters in addition to ratio R. For example, Applicant has found that a combination of ratio R and tilt can indicate whether an impairment is a standing wave impairment or a water impairment. For instance, FIG. 17 is a graph 1700 of ratio R versus tilt for several example spectrum responses, where each spectrum response is indicated by a solid circle. Spectrum responses to the left 1704 of a line 1702 correspond to a water impairment. Spectrum responses to the right 1706 of line 1702 correspond to a standing wave impairment. Accordingly, in an alternate embodiment of method 1410, decision block 1412 is modified to determine if a spectrum response, as represented by coordinates corresponding to its ratio R and spectrum response tilt, is left of line 1702. If yes, method 1700 proceeds to block 1416, and if no, method 1700 proceeds to block 1414. Further below is one example of instructions that may be executed by processing subsystem 202 to determine the values of FIG. 17.

Some embodiments of ID system 102 are configured to determine whether an impairment of communication medium 106 is a standing wave impairment or a water impairment at least partially by comparing an impulse response to one or more models, such as statistical models or empirical models. For example, certain embodiments of ID system 200 include one or more models (not shown) stored in memory subsystems 204, where each model represents either a standing wave impairment or a water impairment. In these embodiments, processing subsystem 202 is configured to compare impulse response 206 or autocorrelated impulse response 208 to the models, to determine which model most closely resembles impulse response 206 or autocorrelated response 208. Processing subsystem 202 then identifies the impairment of communication medium 106 as being the impairment associated with the model most closely resembling the impulse response or the autocorrelated impulse response. For example, assume that processing subsystem 202 determines that impulse response 206 is most closely resembles a model corresponding to a standing wave impairment. In response, processing subsystem 202 determines that communication medium 106 exhibits a standing wave impairment, and processing subsystem 202 accordingly generates identification signal 120 such that it indicates communication medium 106 exhibits a standing wave impairment. As another example, assume that processing subsystem 202 determines that autocorrelated impulse response 208 most closely resembles a model corresponding to a water impairment. In response, processing subsystem 202 determines that communication medium 106 exhibits a water impairment, and processing subsystem accordingly generates identification signal 120 such that it indicates that communication medium 106 corresponds to a water impairment.

Additionally, some embodiments of ID system 102 are configured to use a neural network, or another form of artificial intelligence, to determine from an impulse response of communication medium 106, or an autocorrelated impulse response of communication medium 106, whether an impairment of communication medium 106 is a standing wave impairment or a water impairment. For example, in an embodiment, processing subsystem 202 and memory subsystem 204 collectively implement a neural network that has been trained with multiple impulse responses corresponding to either a standing wave impairment or a water impairment, and the neural network or machine learning software is capable of classifying an impairment of communication medium 106 as either a standing wave impairment or a water impairment from impulse response 206 or autocorrelated impulse response 208.

Figure 18:
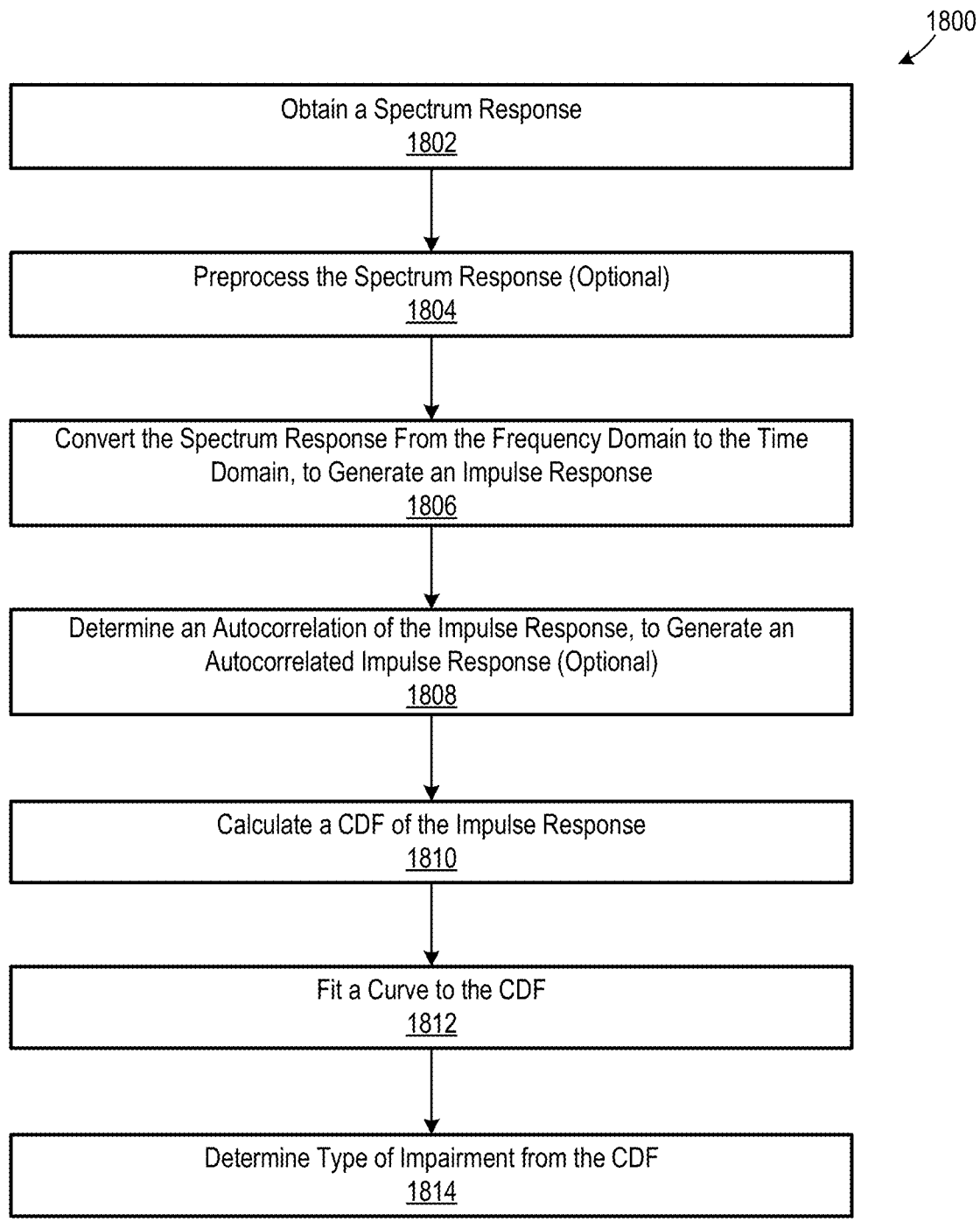
FIG. 18 is a flow chart of another method for automatically identifying an impairment of a communication medium, according to an embodiment.

As discussed above, an impairment of a communication medium can also be identified at least partially from a shape of a CDF of an associated impulse response. For example, FIG. 18 is a block diagram of a method 1800 for automatically identifying an impairment of a communication medium. Method 1800 includes blocks 1802, 1804, 1806, and 1808, which are the same as blocks 702, 704, 706, and 708, respectively, of method 700 of FIG. 7. Additionally, blocks 1804 and 1808 are optional. Method 1800 proceeds from block 1808 to block 1810, or from block 1806 to block 1810 if block 1808 is omitted. In an alternate embodiment of method 1800, blocks 1802-1806 are omitted, and method 1800 begins at either optional block 1808 or at block 1810, using an impulse response included in signal data 118.

In block 1810, a CDF of the impulse response is calculated. In embodiments of method 1800 including optional block 1808, the impulse response considered in block 1810 is the autocorrelated input response generated in block 1808. In embodiments of method 1800 omitting optional block 1808, the impulse response considered in block 1810 is the impulse response generated in block 1806 without autocorrelation. In one example of block 1810, processing subsystem 202 executes CDF instructions 222 to calculate a CDF of autocorrelated impulse response 208, and processing subsystem 202 stores the CDF in memory subsystem 204.

In a block 1812 of method 1800, a curve is fitted to the CDF. The curve is, for example, an exponential curve having the form of EQN. 5 below, where x is a horizontal coordinate, y is a vertical coordinate, and a, b, and c are parameters describing the curve. In one example of block 1812, processing subsystem 202 executes curve fitting instructions 224 to fit a curve to the CDF calculated in block 1810 using EQN. 5 below, and processing subsystem 202 stores curve parameters a, b, and c in memory subsystem 204.

$$y = a * e^{-b*x} + c \quad (EQN. 5)$$

Figure 20:
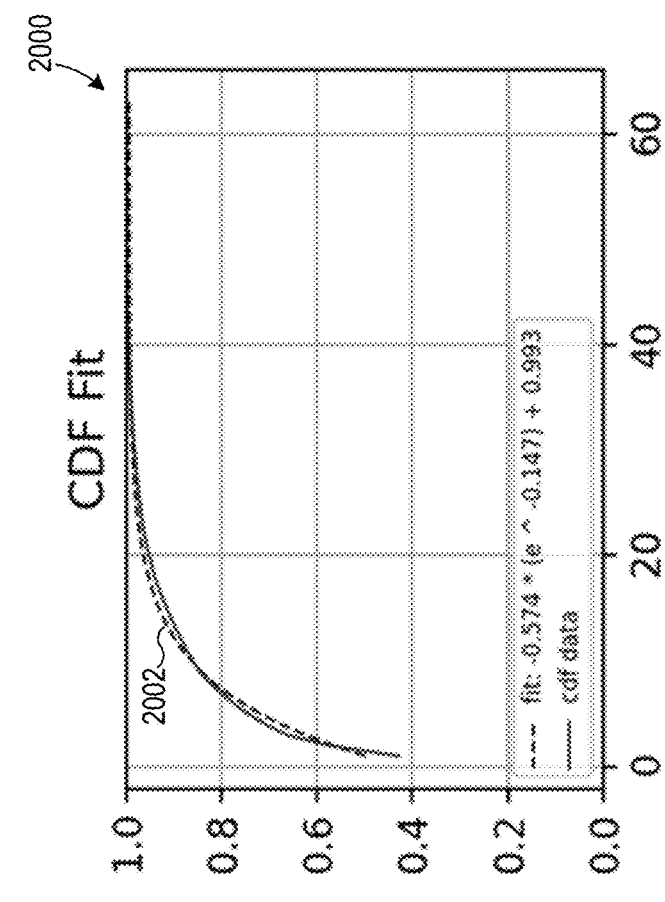
FIG. 20 is a graph illustrating a curve fit to the FIG. 19 cumulative distribution function.
Figure 19:
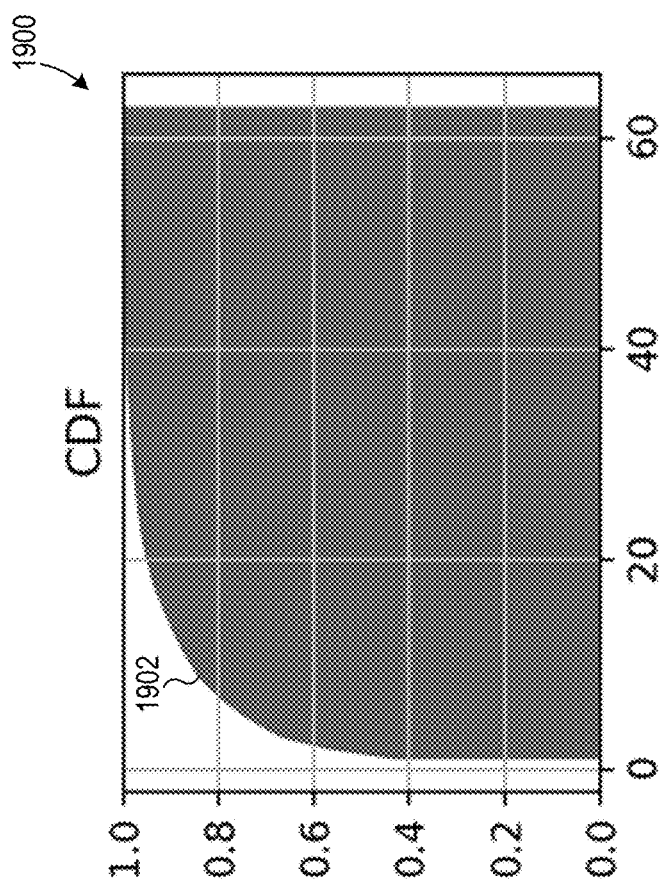
FIG. 19 is a graph illustrating a cumulative distribution function associated with a standing wave impairment.
Figure 22:
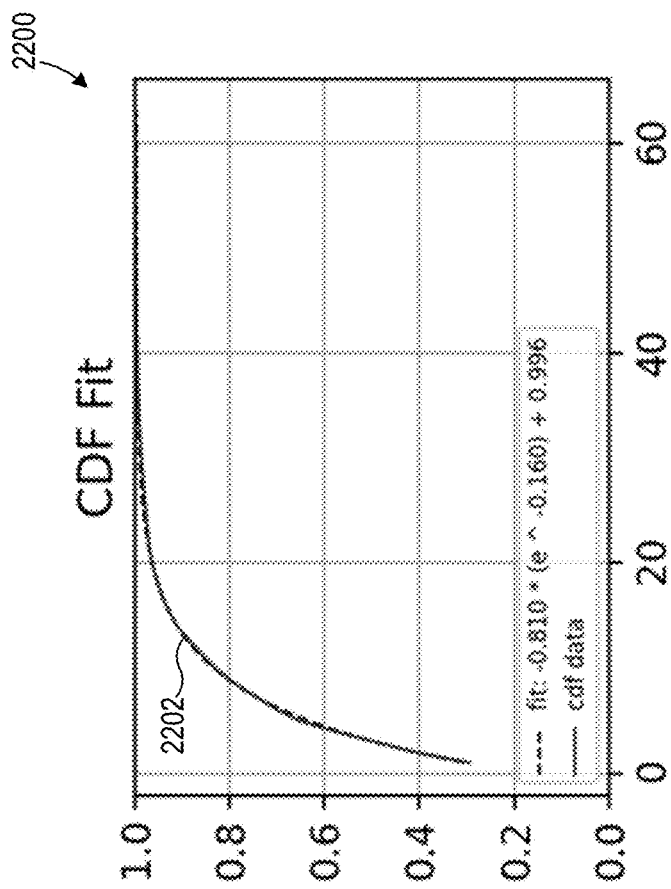
FIG. 22 is a graph illustrating a curve fit to the FIG. 21 cumulative distribution function.
Figure 21:
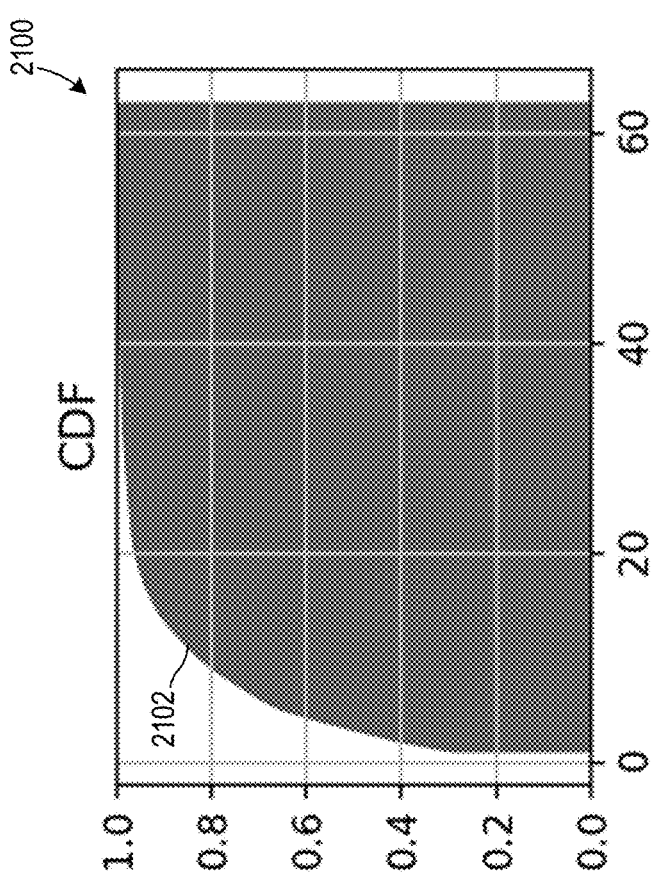
FIG. 21 is a graph illustrating a cumulative distribution function associated with a water impairment.

FIGS. 19, 20, 21, and 22 are graphs 1900, 2000, 2100, and 2200, respectively, which collectively illustrate two different examples scenarios addressed in blocks 1810 and 1812. Graph 1900 illustrates a CDF 1902 of an impulse response associated with a standing wave impairment, and CDF 1902 is an example of a CDF calculated in block 1810. Graph 2000 illustrates a curve 2002 fit to CDF 1902, where curve 2002 is an example of a curve fitted in block 1812. Curve 2002 has the following parameters: a=−0.574, b=0.147, and c=0.993. FIG. 21 illustrates a CDF 2102 of an impulse response associated with a water wave impairment, and CDF 2102 is an example of a CDF calculated in block 1810. Graph 2200 illustrates a curve 2202 fit to CDF 2102, where curve 2202 is an example of a curve fitted in block 1812. Curve 2202 has the following parameters: a=−0.810, b=0.160, and c=0.996. As evident when comparing FIGS. 20 and 22, value of curve parameter a is more negative in the water impairment example (FIG. 22) than the standing wave impairment (FIG. 20). Additionally, curve parameter b is larger for the water impairment example than the standing wave example, and curve parameter c is larger for the water impairment example than the standing wave example. Accordingly, a standing wave impairment can be distinguished from a water impairment from curve parameters a, b, and/or c.

Referring again to FIG. 18, in a block 1814, the type of impairment, e.g., a standing wave impairment or a water impairment, is determined from the curve fit in 1812, such as from curve parameters a, b, and/or c, and processing subsystem 102 is optionally configured to generate ID signal 120 in block 1814 after determining the impairment type. For example, processing subsystem 202 could be configured to execute curve evaluation instructions 226 to determine that an impairment is a standing wave impairment in response to curve parameter a being greater than or equal to a threshold value, and processing subsystem 202 may be configured to determine that an impairment is a water impairment in response to curve parameter a being less than the first threshold value. As another example, processing subsystem 202 could be configured to execute curve evaluation instructions 226 to determine that an impairment is a water impairment in response to curve parameter b being greater than or equal to a second threshold value, and processing subsystem 202 may be configured to determine that the impairment is a standing wave impairment in response to curve parameter b being less than the second threshold value.

As yet another example, processing subsystem 202 could be configured to execute curve evaluation instructions 226 to determine whether an impairment is a standing wave impairment or a water impairment based on a function of each of curve parameters a, b, and c, such as by comparing these parameters to statistical models of CDF curves corresponding to various communication medium impairments. For example, certain embodiments of ID system 200 include one or more models (not shown) of CDF curves, where each model represents either a standing wave impairment or a water impairment. In these embodiments, processing subsystem 202 is configured to compare curve parameters a, b, and c (or other curve parameters) to the models, to determine which model most closely resembles the curve parameters. Processing subsystem 202 then identifies the impairment of communication medium 106 as being the impairment associated with the model most closely resembling the curve parameters. For example, assume that processing subsystem 202 determines that the curve parameters most closely resemble a model corresponding to a standing wave impairment. In response, processing subsystem 202 determines that communication medium 106 exhibits a standing wave impairment, and processing subsystem 202 accordingly generates identification signal 120 such that it indicates communication medium 106 exhibits a standing wave impairment. As another example, assume that processing subsystem 202 determines that the curve parameters most closely resemble a model corresponding to a water impairment. In response, processing subsystem 202 determines that communication medium 106 exhibits a water impairment, and processing subsystem 202 accordingly generates identification signal 120 such that it indicates that communication medium 106 exhibits to a water impairment.

Additionally, some embodiments of ID system 102 are configured to use a neural network, or another form of artificial intelligence, to determine from CDF curve parameters (or from a CDF itself) whether an impairment of communication medium 106 is a standing wave impairment or a water impairment. For example, in an embodiment, processing subsystem 202 and memory subsystem 204 collectively implement a neural network that has been trained with multiple curve parameters corresponding to a standing wave impairment or a water impairment, and the neural network is capable of classifying an impairment of communication medium 106 as either a standing wave impairment or a water impairment from CDF curve parameters.

Additionally, some embodiments of ID system 102 are configured to execute two or more different methods to identify an impairment of communication medium 106, such as to achieve greater certainty that the impairment is correctly identified, or to enable identification of the impairment when the impairment cannot be positively identified using a single identification method. For example, some embodiments of ID system 102 are configured to identify an impairment of communication medium 106 from both a distribution of impulse response coefficients and a CDF of impulse response coefficients. As another example, certain embodiments of ID system 102 are configured to use multiple model types to identify an impairment of communication medium 106. In these embodiments, it is possible that the different methods used to determine an impairment of communication medium 106 may not agree. For example, one model may indicate a standing wave impairment while another model may indicate a water impairment. Accordingly, some embodiments of ID system 102 are further configured to resolve a conflict in identification of the communication impairment. For example, ID system 102 may be configured to identify the impairment of communication medium 106 as being the impairment identified by the majority of identification methods. For instance, assume that two model types indicate that communication medium 106 exhibits a water impairment while one model type indicates that communication medium 106 exhibits a standing wave impairment. ID system 102 may indicate that communication medium 106 exhibits a water impairment because this type of impairment was indicated by the majority of models. As another example, ID system 102 may be configured to identify the impairment of communication medium 106 as an impairment identified by one of several methods that are deemed most reliable.

Furthermore, some embodiments of ID system 102 are configured to implement weighted voting of different identification methods, to identify an impairment of communication medium 106. For example, an embodiment of ID system 102 is configured to identify an impairment of communication medium 106 using (1) a first method based on a distribution of impulse response coefficients, (2) a second method based on an impulse response CDF, and (3) a third method based on spectrum response tilt. Each of these identification methods generates a respective "vote," i.e., whether the impairment of communication medium 106 is a standing wave impairment or a water impairment. In this embodiment, ID system 102 is further configured to execute predetermined rules to generate a final determination of the impairment from the votes of the three identification methods. For example, in a particular embodiment, ID system 102 is configured to identify the impairment based on a consensus of the votes of the three identification methods, where ID system 102 weighs at least two of the votes differently. For example, ID system 102 may be configured to weigh the votes of the first and second identification methods higher than the vote of the third identification method. Such implementation of weighted voting by ID system 102 may advantageously improve impairment identification accuracy and/or enable identification of an impairment that cannot be positively identified using a single identification method.

Additionally, certain embodiments of ID system 102 are configured to implement a sequential ordering of different identification methods to identify an impairment of communication medium 106. For example, assume that a first identification method, such as identifying the impairment from a distribution of impulse response coefficients or a CDF of an impulse response, is known to be highly accurate, but the first identification method is not capable of identifying an impairment under certain conditions. ID system 102 may be configured to augment the first identification method with one or more additional identification methods to help ensure that the impairment of communication medium 106 can be identified under all conditions. ID system 102 may be configured to apply the one or more additional identification methods only if the first identification method generates an ambiguous result, to prevent unnecessary execution of multiple identification methods. As another example, some embodiments of ID system 102 are configured to repeatedly execute one or more methods for identifying an impairment of communication medium 106 until a condition is satisfied. Examples of this condition include, but are not limited to, (a) confidence in the impairment identification meeting or exceeding a threshold value, (b) the impairment no longer being detected, such as due to communication medium 106 being repaired, or (c) the impairment being acknowledged. As yet another example, some embodiments of ID system 102 are configured to (a) execute one or more methods to identify an impairment of communication medium 106 and optionally tentatively identify the impairment, (b) acquire additional information regarding the impairment, and (c) subsequently execute one or more method to identify the impairment, to generate a final identification of the impairment.

Moreover, some embodiments of ID system 102 are configured to automatically recommend an action in response to an identified impairment of communication medium 106, such as in accordance with a rules-based decision process considering the type of identified impairment, the severity of the impairment, and/or confidence that ID system 102 has correctly identified the impairment. The automatically recommended action may be expressed as part of identification signal 120 and may include, for example, a recommendation to (a) take no immediate action, e.g., if the identified impairment is unlikely to cause service issues, (b) dispatch a technician to check communication medium 106, e.g., if the identified impairment is severe and/or is likely to cause service issues, (c) flag communication medium 106 for further observation, (d) flag communication medium 106 to be checked by a technician when a technician is in the area of communication medium 106 for other business, (e) flag communication medium 106 for checking by a technician in a manner which clusters diagnostic work to help maximize technician efficiency, (f) flag communication medium 106 for collection of additional data and/or for increased frequency of data collection, or (g) flag communication medium 106 for being checked at a future time based on the identified impairment and possibility of more relevant data being available at the future time.

Example Instructions

By way of example and not by limitation, the following is one example of C++ code that is executed by an embodiment of processing subsystem 202 to determine the values of FIG. 17:

```
#include <iostream>
//some C libraries to use
#include <math.h>
#include <stdio.h>
#include <stdlib.h>
#include <malloc.h>
#include <stdlib.h>
#include <string.h>
typedef struct {float real, imag;} COMPLEX;
extern void fourier(COMPLEX *,int);//fast Fourier transform
extern void ifourier(COMPLEX *,int);//fast inverse Fourier transform
int main( ) {
    COMPLEX *x, *y,*z;
    FILE *input,*output,*results;
    float
cc[8192],mag[2048],dc,MAG,lAvg,hAvg,MTR1,MTR2,a,b,c,d,ccavg=0;
    int i,j,k,offset=2200,pz=1;
  x=(COMPLEX*) calloc(4096, sizeof(COMPLEX));
  if(!x){printf("\n Unable to allocate input memory.\n");printf("\x7");exit(1);};
  y=(COMPLEX*) calloc(4096, sizeof(COMPLEX));
  if(!y){printf("\n Unable to allocate input memory.\n");printf("\x7");exit(1);};
    char fname[24];
//for(j=7;j<8;j++){ //#4 has dead spectrum
for(j=4;j<5;j++){
//for(j=14;j<15;j++){
  itoa(j+1,fname,10);
  strcat(fname,".txt");
  printf("%s\n",fname);
// if( (input = fopen(fname, "r") ) == NULL){
//         printf("could not open file.\n"); system("pause"); exit(0);
//     }
    if( (input = fopen("JM.txt", "r") ) == NULL){
        printf("could not open file.\n"); system("pause"); exit(0);
    }
    if( (output = fopen("output.txt", "w") ) == NULL){
        printf("could not open file.\n"); system("pause");exit(0);
    }
    if( (results = fopen("results.txt", "a") ) == NULL){
        printf("could not open file.\n"); system("pause");exit(0);
    }
    for(i=0;i<8192;i++){
        fscanf(input,"%f",&cc[i]);
    if(i<8)printf("~%d\t%f\n",i,cc[i]);
    }
    fprintf(output,"file# = %s\toffset = %d\n",fname,offset);
    fprintf(output,"1_raw tilted spectral data, linear and log \n");
    for(i=0;i<4096;i++){
       if(i<10) printf("%d\t%f\n",i,cc[i+offset]);
       fprintf(output,"%d\t%f\n",i,cc[i+offset]);
    }
    //now remove tilt from the spectral data in the FD on a dB (log) basis
    lAvg=0;hAvg=0;//initialize
    for(i=0;i<256;i++){
       lAvg += cc[i+offset];
    }
    for(i=0;i<256;i++){
       hAvg += cc[4095-i+offset];
    }
    float tilt;
    tilt = hAvg/256 - lAvg/256;
    printf("low average dB = %f\n",lAvg/256);
    printf("high average dB = %f\n",hAvg/256);
    printf("tilt = %f\n",tilt);
    fprintf(output,"offset = %d\n",offset);
    //remove tilt
```

```
        for(i=0;i<4096;i++){
           cc[i+offset] += ((float)i/4096)*(1Avg-hAvg)/256;
        }
        //establish an average spectral level after flattening
        for(i=0;i<4096;i++){
           ccavg += cc[i+offset];
        }
        ccavg = ccavg/4096;
        printf("ccavg=%f\n",ccavg);
        fprintf(output,"2_spectral data with tilt removed, peak clipped, holes filled \n");
        for(i=0;i<4096;i++){
           if(cc[i+offset] < ccavg-10) cc[i+offset]=ccavg;//too low
           if(cc[i+offset] > ccavg+15) cc[i+offset]=ccavg;//too high
           fprintf(output,"T %d\t%f\n",i,cc[i+offset]);
        }
        for(i=0;i<4096;i++){
           x[i].real = pow(10,cc[i+offset]/20);
           x[i].imag = 0.0;
        }
        ifourier(x,12);
        //Normalize to make DC term =1.0
        dc = sqrt(x[0].real*x[0].real + x[0].imag*x[0].imag);
        for(i=0;i<4096;i++){y[i].real=0; y[i].imag = 0;}//initialize
        for(i=0;i<64;i++){
           y[i].real = x[i].real/dc;
           y[i].imag = x[i].imag/dc;
        }
        for(i=1;i<64;i++){
           y[4096-i].real = x[i].real/dc;
           y[4096-i].imag = -x[i].imag/dc;
        }
        fprintf(output,"#3 Impulse Response\n");//td 0-64
        for(i=0;i<64;i++){
           MAG = sqrt([i].real * y[i].real + y[i].imag * y[i].imag);
           fprintf(output,"TimeD %d\t%f\t%f\t%f\n",i,y[i].real,y[i].imag,MAG);
        }
        fourier(y,12);
        fprintf(output,"#4 Smoothed FD\n");//
        for(i=0;i<4096;i++){
           MAG = sqrt(y[i].real * y[i].real + y[i].imag * y[i].imag);
           fprintf(output,"SFreqD%d\t%f\t%f\t%f\n",i,y[i].real,y[i].imag,MAG);
        }
        ifourier(y,12);
        for(i=0;i<4096;i++){//complex multiply
           a= y[i].real;
           b= y[i].imag;
           c= y[i].real;
           d= -y[i].imag;
           y[i].real = a*c-b*d;
           y[i].imag = b*c + a*d;
        }
        //fourier(y,12);
           for(i=0;i<64;i++){
           MAG = sqrt(y[i].real * y[i].real + y[i].imag * y[i].imag);
           fprintf(output,"AC %d\t%f\t%f\t%f\n",i,y[i].real,y[i].imag,MAG);
        }
// now determine the largest 2 impulses in the time response
        MAG = 0;
        float MAGmax1 = 0,MAGmax2=0, p1=0,p2=0,p0=0;
        int peak1,peak2;
// find first largest impulse
        for(i=2;i<64;i++){
           MAG = sqrt(y[i].real * y[i].real + y[i].imag * y[i].imag);
           if(MAG>MAGmax1) {MAGmax1 = MAG;peak1 = i;}
           //fprintf(output,"TimeD%d\t%flt%flt%fln",i,y[i].real,y[i].imag,MAG);
        }
// find second largest impulse
        for(i=2;i<64;i++){
           if(i != peak1){
           MAG = sqrt(y[i].real * y[i].real + y[i].imag * y[i].imag);
        }
           if(MAG>MAGmax2 ) {
              MAGmax2 = MAG;
              peak2 = i;
              }
           // fprintf(output,"TimeD%d\t%flt%flt%fln",i,y[i].real,y[i].imag,MAG);
        }
        printf("peak1=%d\tpeak2=%d\n",peak1,peak2);
        printf("mag1=%fltmag2=%fln",MAGmax1,MAGmax2);
```

```
   // system("pause");
   fprintf(output,"#3_time domain data real, imag, magnitude\n");//
   for(i=0;i<4096;i++){
      MAG = sqrt(y[i].real * y[i].real + y[i].imag * y[i].imag);
      fprintf(output,"TimeD%d\t%flt%flt%fln",i,y[i].real,y[i].imag,MAG);
   }
   p0=0;p1=0;p2=0;
   for(i=2;i<64;i++){//find power in impulse response with nothing removed
      MAG = sqrt(y[i].real * y[i].real + y[i].imag * y[i].imag);
      p0 += MAG*MAG;
   }
   for(i=2;i<64;i++){//find power in impulse response with peak1 removed
      MAG = sqrt(y[i].real * y[i].real + y[i].imag * y[i].imag);
      if(i != peak1) p1 += MAG*MAG;
   }
   for(i=2;i<32;i++){//find power in impulse response wit peak2 removed
      MAG = sqrt(y[i].real * y[i].real + y[i].imag * y[i].imag);
      if(i != peak1 && i != peak2) p2 += MAG*MAG;
   }
   float ratio1,ratio2;
   ratio1 = 10*log10(p0/p1);
   ratio2 = 10*log 10(p0/p1)+10*log10(p1/p2);
   fprintf(output,"file= %s\n",fname);
   fprintf(output,"peak1=%d    MAGmax1=%f    Peak2=%d    MAGmax2=%f\n",
peak1,MAGmax1,peak2,MAGmax2);
   fprintf(output,"p0=%f p1=%f p2=%f Ratio 1=%fdB Ratio2=%fdB tilt=%.2f\n",
p0,p1,p2,ratio1,ratio2,tilt);
   fprintf(results,"file=%s\t%f\t%f\t%f\n",fname,ratio1,ratio2,tilt);
   printf("peak1=%d\tMAGmax1=%f\
tPeak2=%d\tMAGmax2=%f\n",peak1,MAGmax1,peak2,MAGmax2);
   printf("p0=%f\tp1=%f\tp2=%f\tRatio1=%fdB\tRatio2=%fdB\n",p0,p1,p2,ratio1,
ratio2);
   fclose(input);
   fclose(output);
   fclose(results);
}//end of for loop
   printf("done\n");
   return 0;
}
//---------------------------------------------------------------------------------------------------------------
void fourier(COMPLEX *x,int m)//takes a fourier transform of size 2 to the m power
{
   static COMPLEX *w;
   static int mstore = 0;
   static int n = 1;
   COMPLEX u,temp,tm;
   COMPLEX *xi,*xip,*xj,*wptr;
   int i,j,k,l,le,windex;
   double arg,w_real,w_imag,wrecur_real,wrecur_imag,wtemp_real;
   if(m != mstore) {
   if(mstore != 0) free(w);
   mstore = m;
   if(m == 0) exit(1);
   n = 1 << m;
   le = n/2;
   w = (COMPLEX *) calloc(le-1,sizeof(COMPLEX));
   if(!w) {
   printf("\nUnable to allocate array\n");
   exit(1);
   }
   arg = 4.0*atan(1.0)/le;
   wrecur_real = w_real = cos(arg);
   wrecur_imag = w_imag = -sin(arg);
   xj = w;
   for (j = 1 ; j < le ; j++) {
      xj->real = (float)wrecur_real;
      xj->imag = (float)wrecur_imag;
      xj++;
      wtemp_real = wrecur_real*w_real - wrecur_imag*w_imag;
      wrecur_imag = wrecur_real*w_imag + wrecur_imag*w_real;
      wrecur_real = wtemp_real;
   }
   }
   le = n;
   windex = 1;
   for (l = 0 ; l < m ; l++) {
   le = le/2;
   for(i = 0;i < n ; i = i + 2*le) {
```

```
            xi = x + i;
            xip = xi + le;
            temp.real = xi->real + xip->real;
            temp.imag = xi->imag + xip->imag;
            xip->real = xi->real - xip->real;
            xip->imag = xi->imag - xip->imag;
            *xi = temp;
         }
         wptr = w + windex - 1;
         for (j = 1 ; j < le ; j++) {
            u = *wptr;
            for(i = j ; i < n ; i = i + 2*le) {
               xi = x + i;
               xip = xi + le;
               temp.real = xi->real + xip->real;
               temp.imag = xi->imag + xip->imag;
               tm.real = xi->real - xip->real;
               tm.imag = xi->imag - xip->imag;
               xip->real = tm.real*u.real - tm.imag*u.imag;
               xip->imag = tm.real*u.imag + tm.imag*u.real;
               *xi = temp;
            }
            wptr = wptr + windex;
         }
         windex = 2*windex;
      }
      j = 0;
      for (i = 1 ; i < (n-1) ; i++) {
         k = n/2;
         while(k <= j) {
            j = j - k;
            k = k/2;
         }
         j = j + k;
         if (i < j) {
            xi = x + i;
            xj = x + j;
            temp = *xj;
            *xj = *xi;
            *xi = temp;
         }
      }
}//end of fourier
void ifourier(COMPLEX *x,int m)
{
      static COMPLEX *w;      /* used to store the w complex array */
      static int mstore = 0;      /* stores m for future reference */
      static int n = 1; /      * length of ifft stored for future */
      COMPLEX u,temp,tm;
      COMPLEX *xi,*xip,*xj,*wptr;
      int i,j,k,l,le,windex;
      double arg,w_real,w_imag,wrecur_real,wrecur_imag,wtemp_real;
      float scale;
      if(m != mstore) {
/* free previously allocated storage and set new m */
         if(mstore != 0) free(w);
         mstore = m;
         if(m == 0) exit(1);       /* if m=0 then done */
/* n = 2**m = inverse fft length */
         n = 1 << m;
         le = n/2;
/* allocate the storage for w */
         w = (COMPLEX *) calloc(le-1,sizeof(COMPLEX));
         if(!w) {
            printf("\nUnable to allocate complex W array\n");
            exit(1);
         }
         /* calculate the w values recursively */
         arg = 4.0*atan(1.0)/le;      /* PI/le calculation */
         wrecur_real = w_real = cos(arg);
         wrecur_imag = w_imag = sin(arg);    /* opposite sign from fft */
         xj = w;
         for (j = 1 ; j < le ; j++) {
            xj->real = (float)wrecur_real;
            xj->imag = (float)wrecur_imag;
            xj++;
            wtemp_real = wrecur_real*w_real - wrecur_imag*w_imag;
            wrecur_imag = wrecur_real*w_imag + wrecur_imag*w_real;
            wrecur_real =wtemp_real;
```

```
        }
    }
/* start inverse fft */
    le = n;
    windex = 1;
    for (l = 0 ; l < m ; l++) {
        le = le/2;
/* first iteration with no multiplies */
        for(i = 0;i < n ; i = i + 2*le) {
            xi = x + i;
            xip = xi + le;
            temp.real = xi->real + xip->real;
            temp.imag = xi->imag + xip->imag;
            xip->real = xi->real - xip->real;
            xip->imag =xi->imag - xip->imag;
            *xi = temp;
        }
/* remaining iterations use stored w */
        wptr = w + windex - 1;
        for (j = 1 ; j < le ; j++) {
            u = *wptr;
            for(i = j ; i < n ; i = i + 2*le) {
                xi = x + i;
                xip = xi + le;
                temp.real = xi->real + xip->real;
                temp.imag = xi->imag + xip->imag;
                tm.real = xi->real - xip->real;
                tm.imag = xi->imag - xip->imag;
                xip->real = tm.real*u.real - tm.imag*u.imag;
                xip->imag = tm.real*u.imag + tm.imag*u.real;
                *xi = temp;
            }
            wptr = wptr + windex;
        }
        windex = 2*windex;
    }
/* rearrange data by bit reversing */
    j = 0;
    for (i = 1 ; i < (n-1) ; i++) {
        k = n/2;
        while(k <= j) {
            j = j - k;
            k = k/2;
        }
        while(k <= j) {
            j = j + k;
            if (i < j) {
                xi = x + i;
                xj = x + j;
                temp = *xj;
                *xj = *xi;
                *xi = temp;
            }
        }
    }
/* scale all results by 1/n */
    scale = (float)(1.0/n);
    for(i = 0 ; i < n ; i++) {
        x->real = scale*x->real;
        x->imag = scale*x->imag;
        x++;
    }
}
```

Combinations of Features

Features described above may be combined in various ways without departing from the scope hereof. The following examples illustrate some possible combinations.

(A1) A method for automatically identifying an impairment of a communication medium includes (1) obtaining an impulse response of the communication medium based on communication signals traveling through the communication medium and (2) identifying the impairment of the communication medium at least partially based on one or more characteristics of the impulse response.

(A2) In the method denoted as (A1), obtaining the impulse response of the communication medium based on communication signals traveling through the communication medium may include (1) obtaining a spectrum response of communication signals traveling through the communication medium and (2) converting the spectrum response from a frequency domain to a time domain, to generate the impulse response.

(A3) The method denoted as (A2) may further include, before converting the spectrum response from the frequency domain to the time domain, preprocessing the spectrum response.

(A4) In the method denoted as (A3), preprocessing the spectrum response may include one or more of flattening the spectrum response, interpolating a missing portion of the spectrum response, and removing tilt from the spectrum response.

(A5) In any one of the methods denoted as (A1) through (A4), identifying the impairment of the communication medium at least partially based on one or more characteristics of the impulse response may include distinguishing between a water impairment of the communication medium and a standing wave impairment of the communication medium at least partially based on a quantity of coefficients of the impulse response.

(A6) In any one of the methods denoted as (A1) through (A5), identifying the impairment of the communication medium at least partially based on one or more characteristics of the impulse response may include (1) determining a quantity (Q) of coefficients of the impulse response having a magnitude of at least a first threshold value and (2) determining that the impairment of the communication medium is a standing wave impairment in response to Q being at least a second threshold value.

(A7) In any one of the methods denoted as (A1) through (A6), identifying the impairment of the communication medium at least partially based on one or more characteristics of the impulse response may include (1) determining a quantity (Q) of coefficients of the impulse response having a magnitude of at least a first threshold value and (2) determining that the impairment of the communication medium is a standing wave impairment in response to Q not being at least a second threshold value.

(A8) In any one of the methods denoted as (A1) through (A7), identifying the impairment of the communication medium at least partially based on one or more characteristics of the impulse response may include identifying the impairment of the communication medium based on total power of a subset of coefficients of the impulse response relative to total power of all coefficients of the impulse response.

(A9) In any one of the methods denoted as (A1) through (A8), identifying the impairment of the communication medium at least partially based on one or more characteristics of the impulse response may include (1) calculating a cumulative distribution function of the impulse response and (2) identifying the impairment of the communication medium at least partially based on the cumulative distribution function.

(A10) In the method denoted as (A9), identifying the impairment of the communication medium at least partially based on the cumulative distribution function may include (1) fitting a curve to the cumulative distribution function and (2) identifying the impairment of the communication medium at least partially based on one or more parameters of the curve.

(A11) In the method denoted as (A10), the curve may be an exponential curve.

(A12) Any one of the methods denoted as (A1) through (A10) may further include determining an autocorrelation of the impulse response before identifying the impairment of the communication medium at least partially based on one or more characteristics of the impulse response.

(A13) In any one of the methods denoted as (A1) through (A12), identifying the impairment of the communication medium at least partially based on one or more characteristics of the impulse response may include using a processor subsystem executing instructions stored in a memory subsystem.

(A14) In any one of the methods denoted as (A1) through (A13), the communication medium may include a coaxial electrical cable.

(B1) A method for automatically identifying an impairment of a communication medium includes (1) obtaining a spectrum response of communication signals traveling through the communication medium, (2) generating an impulse response at least partially by converting the spectrum response from a frequency domain to a time domain, and (3) identifying the impairment of the communication medium at least partially based on a distribution of coefficients of the impulse response.

(B2) In the method denoted as (B1), identifying the impairment of the communication medium at partially based on a distribution of coefficients of the impulse response may include (1) determining a ratio relating (a) a total magnitude of a subset of coefficients of the impulse response to (b) a total magnitude of all coefficients of the impulse response, and (2) identifying the impairment of the communication medium at partially based on a value of the ratio.

(B3) Any one of the methods denoted as (B1) and (B2) may further include, before identifying the impairment of the communication medium at least partially based on the distribution of coefficients of the impulse response, determining an autocorrelation of the impulse response.

(C1) A method for automatically identifying an impairment of a communication medium includes (1) obtaining a spectrum response of communication signals traveling through the communication medium, (2) generating an impulse response at least partially by converting the spectrum response from a frequency domain to a time domain, (3) calculating a cumulative distribution function of the impulse response, (4) fitting a curve to the cumulative distribution function, and (5) identifying the impairment of the communication medium at least partially based on one or more parameters of the curve.

(C2) The method denoted as (C1) may further include, before calculating the cumulative distribution function of the impulse response, determining an autocorrelation of the impulse response.

(C3) In any one of the methods denoted as (C1) and (C2), the curve may be an exponential curve.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for automatically identifying an impairment of a communication medium, comprising:
    obtaining an impulse response of the communication medium based on communication signals traveling through the communication medium; and
    identifying the impairment of the communication medium as being a water impairment at least partially in response to a quantity (Q) of coefficients of the impulse response having a magnitude of at least a first threshold value relative to a total number of coefficients of the impulse response.

2. The method of claim 1, wherein obtaining the impulse response of the communication medium based on communication signals traveling through the communication medium comprises:

obtaining a spectrum response of communication signals traveling through the communication medium; and converting the spectrum response from a frequency domain to a time domain, to generate the impulse response.

3. The method of claim 2, further comprising, before converting the spectrum response from the frequency domain to the time domain, preprocessing the spectrum response.

4. The method of claim 3, wherein preprocessing the spectrum response comprises one or more of flattening the spectrum response, interpolating a missing portion of the spectrum response, and removing tilt from the spectrum response.

5. The method of claim 1, further comprising determining an autocorrelation of the impulse response before identifying the impairment of the communication medium as being a water impairment.

6. The method of claim 1, further comprising using a processor subsystem executing instructions stored in a memory subsystem to perform the step of identifying the impairment of the communication medium as being a water impairment.

7. The method of claim 1, wherein the communication medium comprises a coaxial electrical cable.

8. A method for automatically identifying an impairment of a communication medium, comprising:

obtaining an impulse response of the communication medium based on communication signals traveling through the communication medium; and identifying the impairment of the communication medium at least partially based on one or more characteristics of the impulse response;

wherein identifying the impairment of the communication medium at least partially based on one or more characteristics of the impulse response comprises:

determining a quantity (Q) of coefficients of the impulse response having a magnitude of at least a first threshold value, and determining that the impairment of the communication medium is a standing wave impairment in response to one of (a) Q being at least a second threshold value and (b) Q not being at least the second threshold value.

9. The method of claim 8, wherein obtaining the impulse response of the communication medium based on communication signals traveling through the communication medium comprises:

obtaining a spectrum response of communication signals traveling through the communication medium; and converting the spectrum response from a frequency domain to a time domain, to generate the impulse response.

10. A method for automatically identifying an impairment of a communication medium, comprising:

obtaining an impulse response of the communication medium based on communication signals traveling through the communication medium; and identifying the impairment of the communication medium at least partially based on one or more characteristics of the impulse response;

wherein identifying the impairment of the communication medium at least partially based on one or more characteristics of the impulse response comprises identifying the impairment of the communication medium based on total power of a subset of coefficients of the impulse response relative to total power of all coefficients of the impulse response.

11. A method for automatically identifying an impairment of a communication medium, comprising:

obtaining an impulse response of the communication medium based on communication signals traveling through the communication medium; and identifying the impairment of the communication medium at least partially based on one or more characteristics of the impulse response;

wherein identifying the impairment of the communication medium at least partially based on one or more characteristics of the impulse response comprises:

calculating a cumulative distribution function of the impulse response, and identifying the impairment of the communication medium at least partially based on the cumulative distribution function.

12. The method of claim 11, wherein identifying the impairment of the communication medium at least partially based on the cumulative distribution function comprises:

fitting a curve to the cumulative distribution function; and identifying the impairment of the communication medium at least partially based on one or more parameters of the curve.

13. The method of claim 12, wherein the curve is an exponential curve.

14. The method of claim 10, wherein obtaining the impulse response of the communication medium based on communication signals traveling through the communication medium comprises:

obtaining a spectrum response of communication signals traveling through the communication medium; and converting the spectrum response from a frequency domain to a time domain, to generate the impulse response.

15. A method for automatically identifying an impairment of a communication medium, comprising:

obtaining a spectrum response of communication signals traveling through the communication medium;

generating an impulse response at least partially by converting the spectrum response from a frequency domain to a time domain; and identifying the impairment of the communication medium at least partially based on a distribution of coefficients of the impulse response at least partially by:

determining a ratio relating (a) a total magnitude of a subset of coefficients of the impulse response to (b) a total magnitude of all coefficients of the impulse response, and identifying the impairment of the communication medium at least partially based on a value of the ratio.

16. The method of claim 15, further comprising, before identifying the impairment of the communication medium at least partially based on the distribution of coefficients of the impulse response, determining an autocorrelation of the impulse response.

17. A method for automatically identifying an impairment of a communication medium, comprising:

obtaining a spectrum response of communication signals traveling through the communication medium;

generating an impulse response at least partially by converting the spectrum response from a frequency domain to a time domain;

calculating a cumulative distribution function of the impulse response;

fitting a curve to the cumulative distribution function; and identifying the impairment of the communication medium at least partially based on one or more parameters of the curve.

18. The method of claim 17, further comprising, before calculating the cumulative distribution function of the impulse response, determining an autocorrelation of the impulse response.

19. The method of claim 17, wherein the curve is an exponential curve.

* * * * *